(12) United States Patent
Inoue

(10) Patent No.: US 12,732,026 B2
(45) Date of Patent: Sep. 8, 2026

(54) MEASURING INSTRUMENT, WIRELESS POWER TRANSFER APPARATUS, AND WIRELESS POWER TRANSFER SYSTEM

(71) Applicant: MITUTOYO CORPORATION, Kanagawa (JP)

(72) Inventor: Kinya Inoue, Kanagawa (JP)

(73) Assignee: MITUTOYO CORPORATION, Kanagawa (JP)

(*) Notice: Subject to any disclaimer, the term of this patent is extended or adjusted under 35 U.S.C. 154(b) by 0 days.

(21) Appl. No.: 19/200,899

(22) Filed: May 7, 2025

(65) Prior Publication Data

US 2025/0364840 A1 Nov. 27, 2025

(30) Foreign Application Priority Data

May 21, 2024 (JP) ................................ 2024-082734
Jan. 9, 2025 (JP) ................................ 2025-003419

(51) Int. Cl.

| | |
|---|---|
| ***H02J 50/27*** | (2016.01) |
| ***H02J 50/00*** | (2016.01) |
| ***H02J 50/40*** | (2016.01) |
| ***H02J 50/80*** | (2016.01) |
| ***H02J 50/90*** | (2016.01) |

(52) U.S. Cl.
CPC ............ *H02J 50/27* (2016.02); *H02J 50/005* (2020.01); *H02J 50/402* (2020.01); *H02J 50/80* (2016.02); *H02J 50/90* (2016.02)

(58) Field of Classification Search
CPC ........ H02J 50/005; H02J 50/27; H02J 50/402; H02J 50/80; H02J 50/90
USPC .......................................................... 307/149
See application file for complete search history.

(56) References Cited

U.S. PATENT DOCUMENTS 10,559,971 B2 * 2/2020 Zeine ...................... H02J 50/20
2016/0301240 A1 10/2016 Zeine et al.

FOREIGN PATENT DOCUMENTS

JP 6725531 B2 7/2020

* cited by examiner

*Primary Examiner* — Hal Kaplan
(74) *Attorney, Agent, or Firm* — Greenblum & Bernstein, P.L.C.

(57) ABSTRACT

A portable measuring instrument is a portable measuring instrument that receives power transferred from a wireless power transfer apparatus for transferring power wirelessly, the measuring instrument includes a plurality of power receiving antennas that receive power transmitted from the wireless power transfer apparatus, a posture detection part that detects a posture of the measuring instrument, and a signal transmission part that transmits a beacon signal including information indicating the posture detected by the posture detection part, wherein after the signal transmission part transmits the beacon signal, any of the plurality of power receiving antennas receives power from the wireless power transfer apparatus.

13 Claims, 15 Drawing Sheets

11
PA1
PA2

11
PA2
POWER RECEIVING ANTENNA
110
CHARGING CIRCUIT
113
SECONDARY BATTERY
114
PRIMARY BATTERY
115
POWER TRANSFER CIRCUIT
116
PA1
SU

11
PA2
GR

CORRECTION VECTOR

MEASURING INSTRUMENT, WIRELESS POWER TRANSFER APPARATUS, AND WIRELESS POWER TRANSFER SYSTEM

CROSS-REFERENCE TO RELATED APPLICATIONS

The present application claims priority to Japanese Patent Application number 2024-082734, filed on May 21, 2024, and number 2025-003419, filed on Jan. 9, 2025, contents of which are incorporated herein by reference in their entirety.

BACKGROUND OF THE INVENTION

The present disclosure relates to a measuring instrument, a wireless power transfer apparatus, and a wireless power transfer system for performing wireless power transfer.

Japanese Patent No. 6725531 discloses a technology for wireless charging, whereby a receiver receives power transmitted by a transmitter via a receiving antenna.

When an electronic device receives power from a wireless power transfer apparatus that transfers power via a radio wave, a receiving antenna may have difficulty receiving a radio wave transmitted from the wireless power transfer apparatus depending on the orientation of the electronic device, which may reduce power transmission efficiency.

BACKGROUND OF THE INVENTION

The present disclosure focuses on this point, and an object thereof is to improve power transmission efficiency when the orientation of an electronic device changes.

A portable measuring instrument according to an aspect of the present disclosure is a portable measuring instrument that receives power transferred from a wireless power transfer apparatus for transferring power wirelessly, the measuring instrument includes a plurality of power receiving antennas that receive power transmitted from the wireless power transfer apparatus, a posture detection part that detects a posture of the measuring instrument, and a signal transmission part that transmits a beacon signal including information indicating the posture detected by the posture detection part, wherein after the signal transmission part transmits the beacon signal, any of the plurality of power receiving antennas receives power from the wireless power transfer apparatus.

DESCRIPTION OF THE PREFERRED EMBODIMENTS

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

[Overview of Wireless Power Transfer System S]

In order to transfer power to a small-sized electronic measuring instrument, it is necessary to set a battery in the electronic measuring instrument, but this presents issues such as a need for battery replacement and battery disposal. Accordingly, in a wireless power transfer system S according to the present embodiment, a wireless power transfer apparatus that transfers power wirelessly is configured to wirelessly transfer power to a portable measuring instrument. This eliminates the need for battery replacement and battery disposal.

Examples of a wireless power transfer method in the wireless power transfer system S include an electromagnetic induction method, a magnetic field resonance method, an electric field coupling method, a laser beam method, and a microwave method. Hereinafter, a case where the wireless power transfer method is a microwave method will be described as an example.

Figure 1:
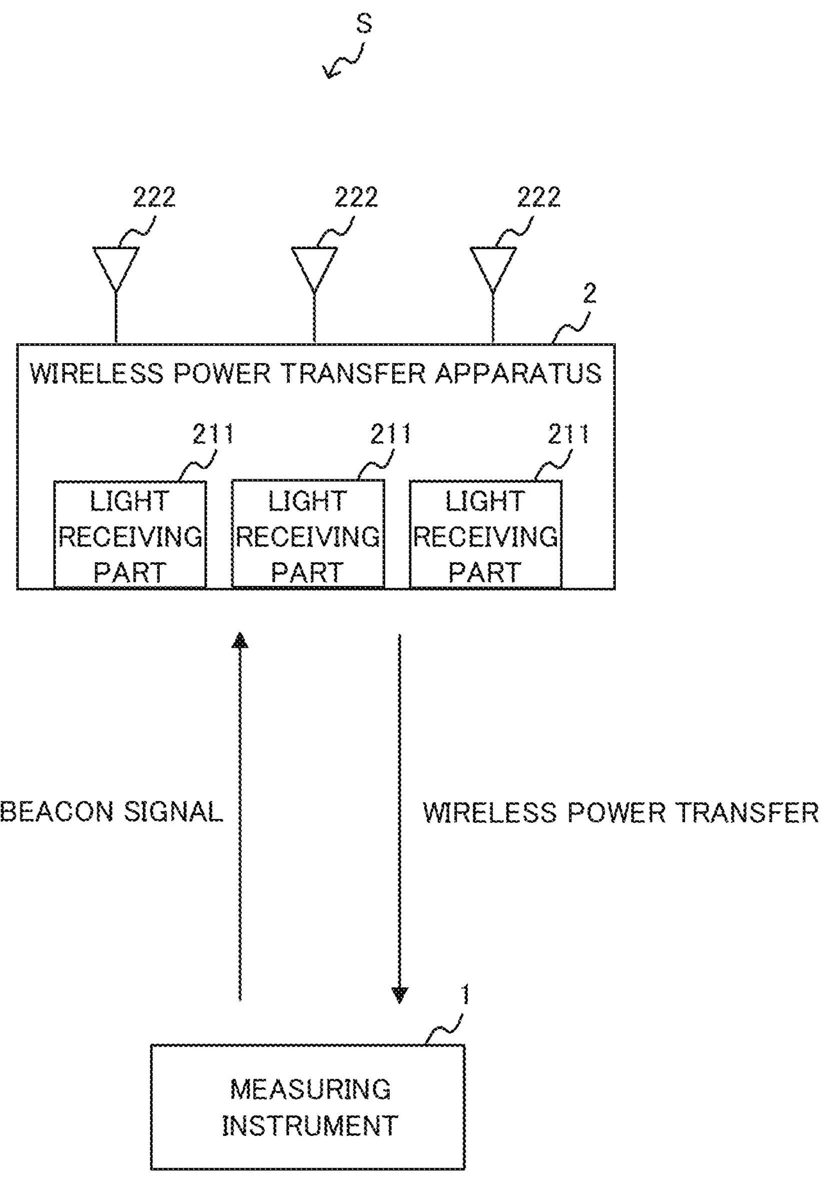
FIG. 1 shows an overview of the operation of a wireless power transfer system S.

FIG. 1 shows an overview of the operation of the wireless power transfer system S. The wireless power transfer system S includes a wireless power transfer apparatus 2 which transfers power wirelessly, and a measuring instrument 1 that receives power transferred from the wireless power transfer apparatus 2.

The measuring instrument 1 is a portable electronic device. The measuring instrument 1 is a digital caliper, a digital indicator, or a digital micrometer, for example. Hereinafter, a case where the measuring instrument 1 is a digital micrometer will be described as an example.

The measuring instrument 1 includes i) a signal transmission part that transmits a beacon signal and ii) a power receiving antenna that receives power transferred from the wireless power transfer apparatus 2. The beacon signal is a signal including information that the measuring instrument 1 notifies the wireless power transfer apparatus 2 about, and is an optical signal or a high-frequency signal (that is, a radio wave), for example. The beacon signal is a signal transmitted so as to reach a range of several meters to several tens of meters in radius once every several seconds, for example. If the wireless power transfer apparatus 2 is located within a range in which the beacon signal transmitted by the measuring instrument 1 reaches, the wireless power transfer apparatus 2 can receive the beacon signal and identify the position of the measuring instrument 1.

A power receiving circuit, which includes a signal transmission part and a power receiving antenna, is incorporated in a power receiving module that has a portion with the same shape as that of a standard battery having a standardized size, for example. The power receiving antenna is a pattern antenna, for example. Thus, by modularizing the power receiving circuit, wireless power transfer can be achieved by attaching the power receiving module to an existing measuring instrument.

The wireless power transfer apparatus 2 is an apparatus that transfers power wirelessly. The wireless power transfer apparatus 2 includes i) a signal receiving part (for example, a light receiving device) that receives a beacon signal and ii) a power transmission part (for example, a power transmission multi-antenna) that transmits power wirelessly.

A flow of wireless power transfer in the present embodiment will be described with reference to FIG. 1. The measuring instrument 1 transmits a beacon signal to the surroundings. The wireless power transfer apparatus 2 receives the beacon signal transmitted from the measuring instrument 1 with a light receiving part 211. The wireless power transfer apparatus 2 that has received the beacon signal wirelessly transfers power to the measuring instrument 1 that has transmitted the beacon signal, via a power transmission antenna 222.

In order to suppress the effect of wireless power transfer on the human body, the wireless power transfer apparatus 2 transfers power to the power receiving antenna of the measuring instrument 1 only when determining that the measuring instrument 1 is located within a predetermined distance from the wireless power transfer apparatus 2 and that no person (operator) is using the measuring instrument 1. In addition, in order to improve the efficiency of wireless power transfer, the wireless power transfer apparatus 2 may transfer power to the power receiving antenna that can receive the largest amount of power transferred by the wireless power transfer apparatus 2, among a plurality of power receiving antennas included in the measuring instrument 1.

The following descriptions provide details on each of i) modularization of the power receiving circuit, ii) suppression of the effect of wireless power transfer on the human body, and iii) an improvement of the efficiency of wireless power transfer.

<Modularization of Power Receiving Circuit>

SUMMARY

In the measuring instrument 1, a small battery such as a button cell is used. In order to enable wireless power transfer using the existing measuring instrument 1, a power receiving module for wirelessly receiving power may be attached to the measuring instrument 1 instead of a battery. However, it is difficult to fit the power receiving module including all the power receiving circuits necessary for wireless power transfer within the size of a button cell. On the other hand, when the size of the power receiving module is increased, the power receiving module may no longer be attachable to the measuring instrument 1 designed to use a button cell.

Therefore, the present embodiment provides a power receiving module including i) a first portion having the same shape as that of the button cell and ii) a second portion having the same shape as that of a lid portion that covers a button cell while a button cell is housed in a housing portion, which can house a button cell, in the measuring instrument 1. The power receiving module according to the present embodiment includes a power receiving antenna that receives power transferred from the wireless power transfer apparatus 2.

The power receiving module includes the first portion so that the power receiving module can be attached to a battery housing portion of the existing measuring instrument 1 instead of the button cell. Further, the power receiving module includes the second portion so that the overall volume of the power receiving module increases by the volume of the second portion, allowing the power receiving circuit for wireless power transfer to be accommodated within the size of the button cell. As described above, the power receiving module has the first portion and the second portion, thereby enabling wireless power transfer to be achieved using the existing measuring instrument 1. Configurations and operations of the measuring instrument 1 and the wireless power transfer apparatus 2 will be described below.

[Configuration and Operation of Measuring Instrument 1]

Figure 2A:
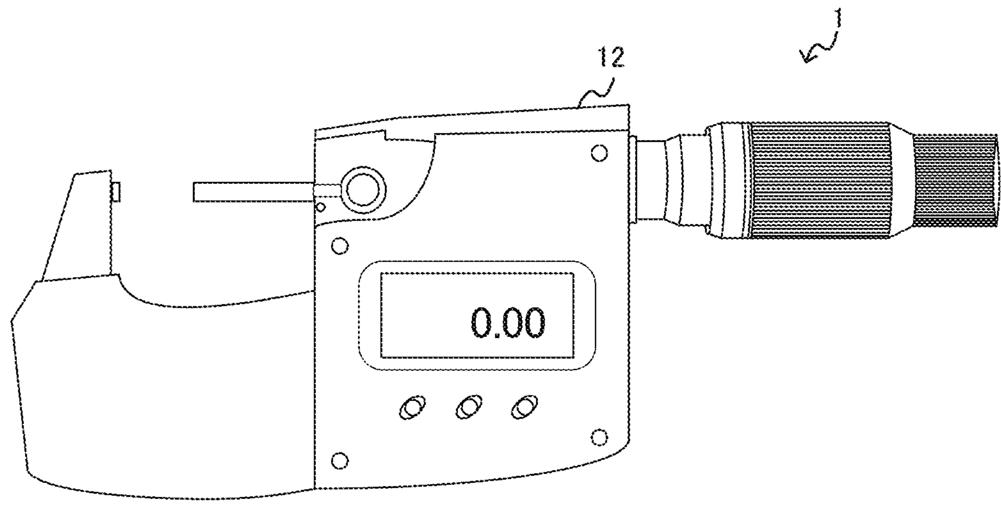
FIGS. 2A and 2B show examples of a measuring instrument 1 without a power receiving module.
Figure 2B:
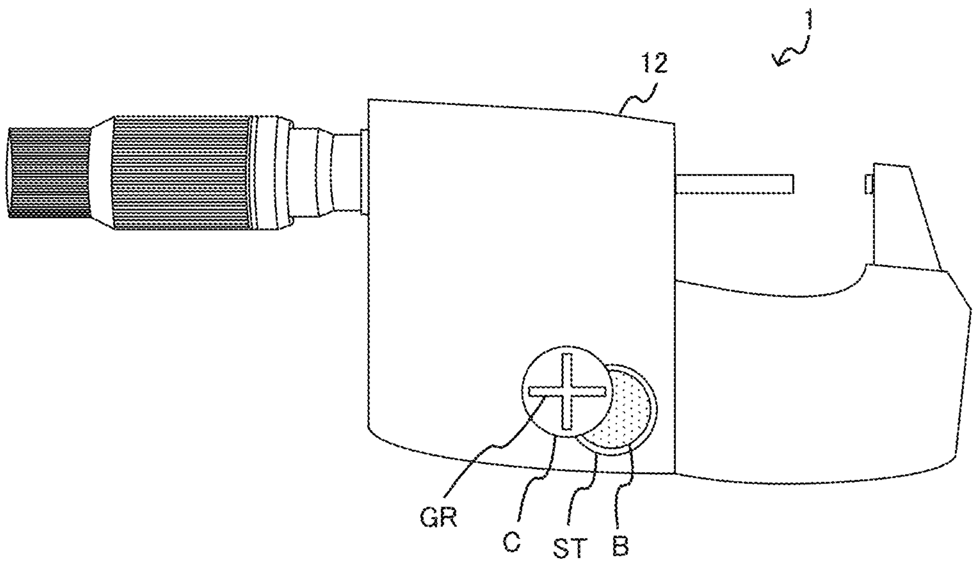

FIGS. 2A and 2B show examples of the measuring instrument 1 without the power receiving module. FIG. 2A is a front view of the measuring instrument 1, and FIG. 2B is a rear view of the measuring instrument 1. The measuring instrument 1 shown in FIGS. 2A and 2B is a digital micrometer.

As shown in FIGS. 2A and 2B, the measuring instrument 1 includes a detachable lid portion C and a main body 12 which is a portion of the measuring instrument 1 other than the lid portion C. A housing portion ST of the main body 12 is a portion capable of housing a standard battery B having a standardized size. The type of the standard battery B is not particularly limited, but is a button cell, for example. The lid portion C is a portion that covers the standard battery B while the standard battery B is housed in the housing portion ST, and that is a battery lid. The lid portion C is provided with a groove GR for rotating the lid portion C. An operator can open and close the lid portion C by hooking a flat-blade screwdriver, fingernail, or the like in the groove GR and rotating the lid portion C. It should be noted that the power receiving module can be attached to the measuring instrument 1, but the power receiving module is not shown in FIGS. 2A and 2B.

Figure 3:
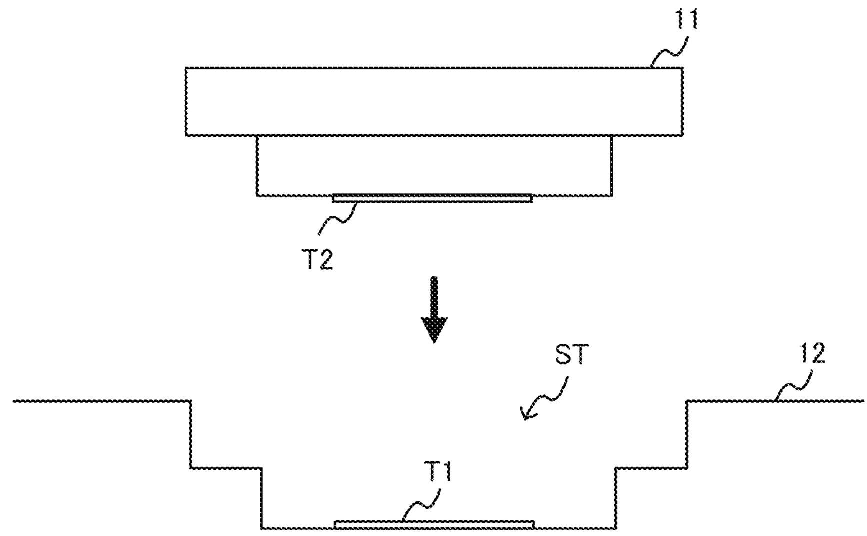
FIG. 3 shows a relationship between a power receiving module 11 and a housing portion ST of a measuring instrument 1.

FIG. 3 shows a relationship between the power receiving module 11 and the housing portion ST of the measuring instrument 1. The power receiving module 11 is a physical device including a power receiving antenna that receives power transferred from the wireless power transfer apparatus 2. As shown in FIG. 3, the power receiving module 11 can be attached to the housing portion ST of the main body 12 of the measuring instrument 1. When a terminal T2 provided to the power receiving module 11 contacts a terminal T1 provided to the housing portion ST while the power receiving module 11 is housed in the housing portion ST, power received by the power receiving module 11 is transferred to the main body 12.

Figure 4:
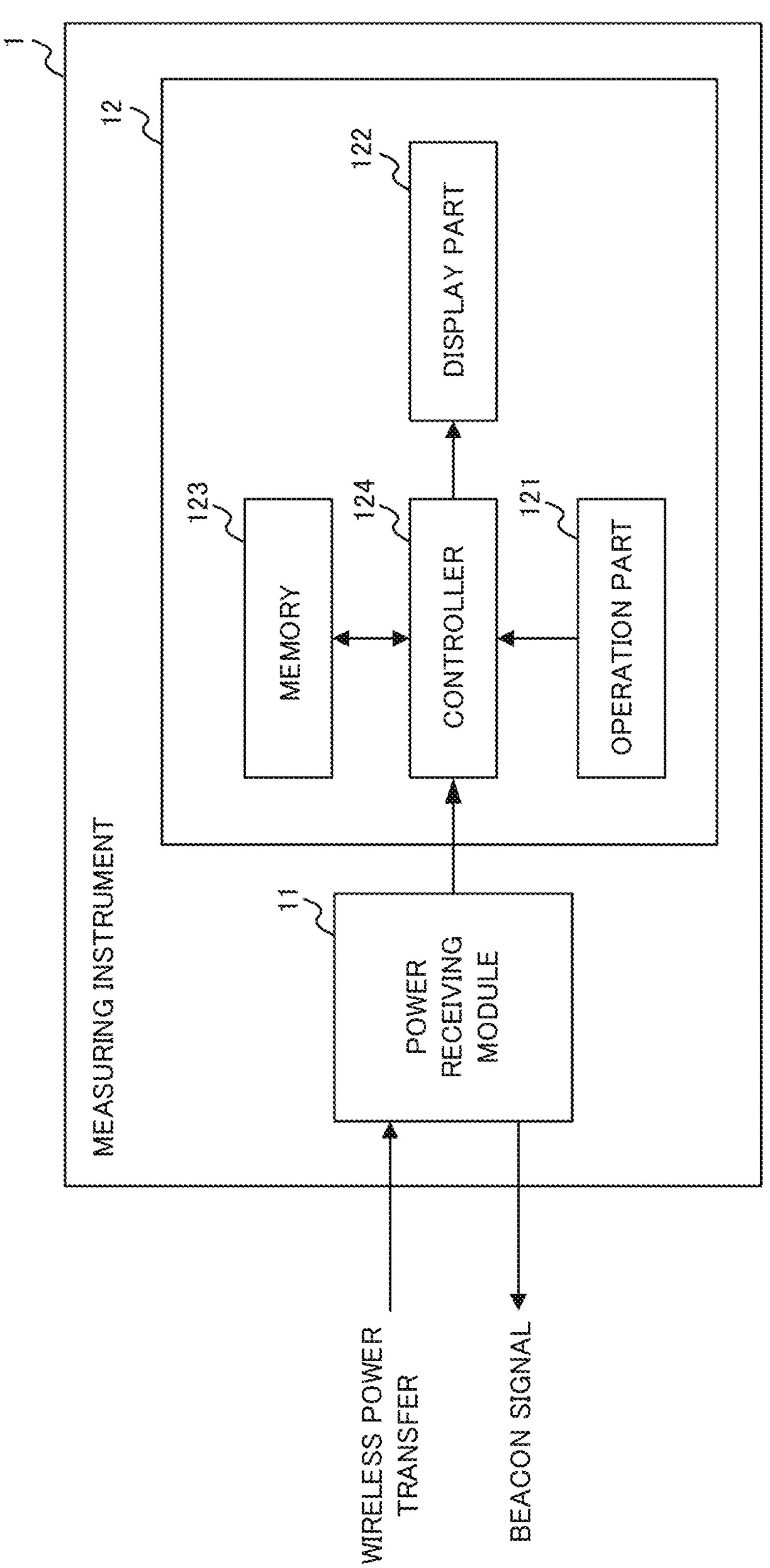
FIG. 4 shows an example of a configuration of the measuring instrument 1.

FIG. 4 shows an example of a configuration of the measuring instrument 1. The measuring instrument 1 includes the power receiving module 11 and the main body 12. The main body 12 includes an operation part 121, a display part 122, a memory 123, and a controller 124.

The operation part 121 is an operation device for receiving an operation from an operator, and is an operation button, for example.

The display part 122 comprises a liquid crystal display, an organic Electro-Luminescence (EL) display, or the like, for example. The display part 122 may be Light Emitting Diodes (LED). The display part 122 displays a measurement result from the measuring instrument 1, indicating that charging is necessary, or the like. Details of processing executed by the display part 122 will be described later.

The memory 123 is a storage medium including a Read Only Memory (ROM), a Random Access Memory (RAM), and the like. The memory 123 stores a program executed by the controller 124.

The controller 124 is a Central Processing Unit (CPU), for example. The controller 124 executes an information processing program stored in the memory 123. Details of processing executed by the controller 124 will be described later.

Figure 5:
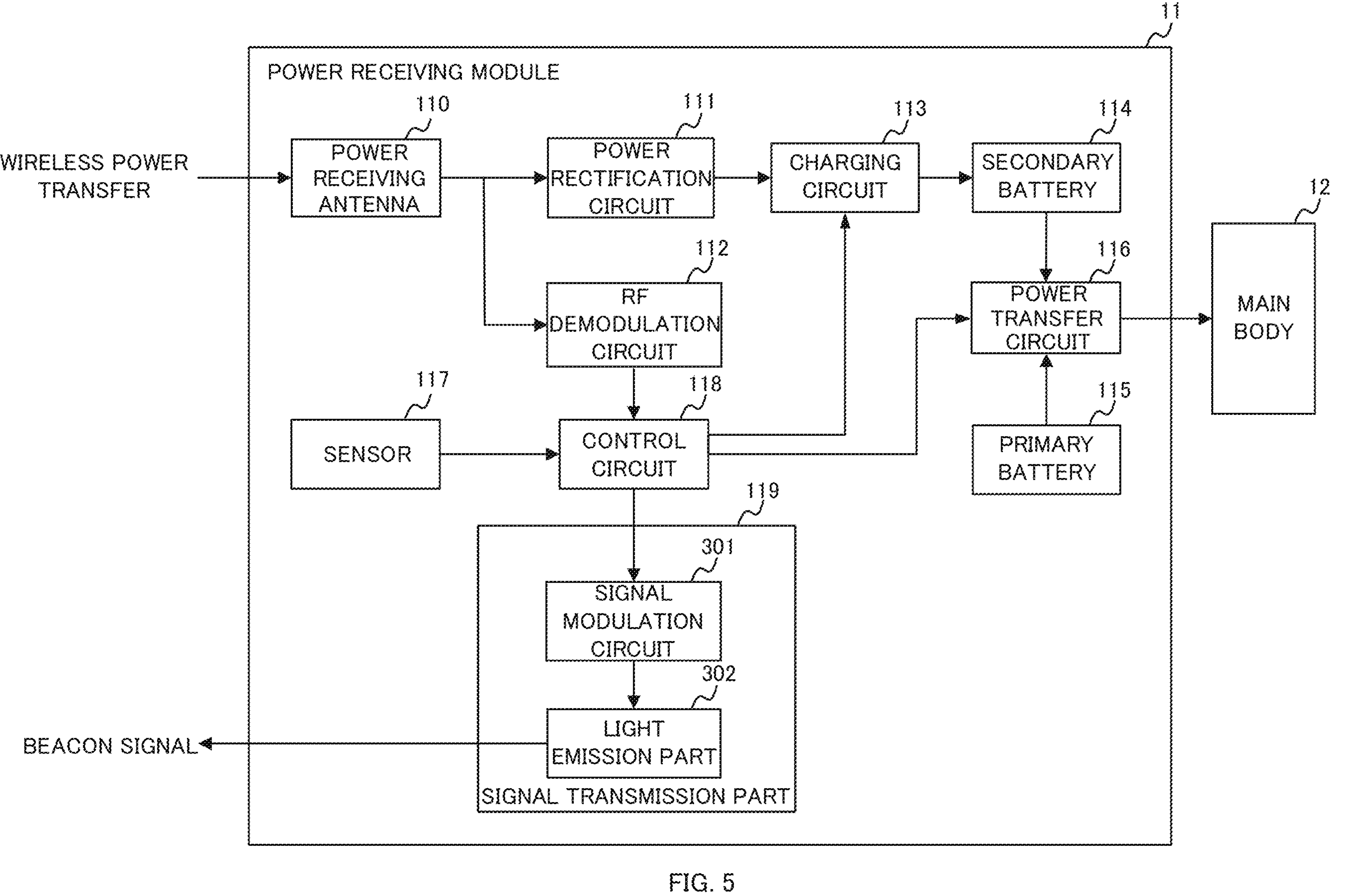
FIG. 5 shows an example of a configuration of the power receiving module 11.

FIG. 5 shows an example of a configuration of the power receiving module 11. The power receiving module 11 includes a power receiving antenna 110, a power rectification circuit 111, an RF demodulation circuit 112, a charging circuit 113, a secondary battery 114, a primary battery 115, a power transfer circuit 116, a sensor 117, a control circuit 118, and a signal transmission part 119. It should be noted that the sensor 117 and the signal transmission part 119 may be provided in the main body 12.

The power receiving antenna 110 is an antenna that receives power transferred from the wireless power transfer apparatus 2. A plurality of power receiving antennas 110 may be provided in the power receiving module 11.

The power rectification circuit 111 converts AC power received from the power receiving antenna 110 into DC power. The power rectification circuit 111 is a circuit that supplies the converted power to the charging circuit 113.

The RF demodulation circuit 112 demodulates an RF (high frequency) signal input from the power receiving antenna 110. The RF demodulation circuit 112 inputs the demodulated signal to the control circuit 118.

The charging circuit 113 is a circuit that supplies the power received from the power rectification circuit 111 to the secondary battery 114. The charging circuit 113 switches between i) a state in which the power received from the power rectification circuit 111 is supplied to the secondary battery 114 and ii) a state in which the power is not supplied thereto, on the basis of a control signal input from the control circuit 118.

The secondary battery 114 is a battery charged with the power received by the power receiving antenna 110. The secondary battery 114 is a storage battery that can be repeatedly used by being charged with power. Since the power receiving module 11 includes the secondary battery 114, the measuring instrument 1 can store wirelessly transferred power.

The primary battery 115 is a battery smaller than the standard battery B, for example. The power capacity of the primary battery 115 may be smaller than the power capacity of the standard battery B. The primary battery 115 is a disposable battery that cannot be reused once completely discharged. As described in detail below, the power receiving module 11 includes the primary battery 115, which allows the measuring instrument 1 to use the power of the primary battery 115 when the remaining capacity of the secondary battery 114 is low and the measuring instrument 1 cannot receive power from the wireless power transfer apparatus 2.

The power transfer circuit 116 is a circuit that transfers the power received from the secondary battery 114 or the primary battery 115 to the main body 12 of the measuring instrument 1. The power transfer circuit 116 can switch which power source to transfer power from, either the secondary battery 114 or the primary battery 115. The power transfer circuit 116 switches which power source to transfer power from, either the secondary battery 114 or the primary battery 115, on the basis of the control signal input from the control circuit 118, for example. It should be noted that the power receiving module 11 may be configured not to include the primary battery 115 and the power transfer circuit 116, and the secondary battery 114 may directly transfer power to the main body 12.

The sensor 117 is a sensor capable of detecting the presence of a person using the measuring instrument 1, and is an acceleration sensor or a proximity sensor, for example. If the sensor 117 is an acceleration sensor, the sensor 117 inputs detection data indicating the detected acceleration to the control circuit 118. If the sensor 117 is a proximity sensor, the sensor 117 periodically transmits infrared light, and upon detecting a person nearby on the basis of the reflected infrared light, inputs detection data indicating the detection of a person to the control circuit 118.

The sensor 117 may be a human sensor capable of detecting the presence of a person around the measuring instrument 1. The human sensor is an infrared sensor (heat ray sensor), an ultrasonic sensor, a microwave sensor, a sound sensor, or an image sensor, for example. The human sensor inputs a detection signal indicating the detection of the presence of a person within the predetermined distance from the measuring instrument 1, to the control circuit 118. The predetermined distance is, for example, a distance within which a radio wave carrying power, when transmitted by the wireless power transfer apparatus 2 to the measuring instrument 1, may have some effect on the body of an operator present around the measuring instrument 1.

The control circuit 118 is a circuit that controls i) charging of the secondary battery 114, ii) switching of power transferred to the main body 12 by the power transfer circuit 116, and iii) transmission of a beacon signal by the signal transmission part 119. The control circuit 118 comprises an electric circuit that outputs a control signal, for example. The control circuit 118 may include a processor and a memory, and the processor may execute a program stored in the memory to output the control signal. The control circuit 118 inputs a control signal to the charging circuit 113 to operate the charging circuit 113 when the remaining capacity of the secondary battery 114 is less than a first threshold and it is detected that wireless power transfer is being performed on the basis of the signal output from the RF demodulation circuit 112, for example.

If the remaining capacity of the secondary battery 114 is equal to or higher than the threshold value, the control circuit 118 transfers the power of the secondary battery 114 to an electric circuit included in the measuring instrument 1. For example, when the remaining capacity of the secondary battery 114 is equal to or higher than a second threshold value, which is smaller than the first threshold value, the control circuit 118 inputs a control signal to the power transfer circuit 116 to transfer the power output from the secondary battery 114 to the main body 12.

On the other hand, when the remaining capacity of the secondary battery 114 is less than a threshold value, the control circuit 118 transfers the power of the primary battery 115 to the electric circuit of the measuring instrument 1. For example, when the remaining capacity of the secondary battery 114 is less than the second threshold value, the control circuit 118 inputs a control signal to the power transfer circuit 116 to transfer the power output from the primary battery 115 to the main body 12.

The control circuit 118 operates in this manner, thereby enabling the main body 12 to operate even when the remaining capacity of the secondary battery 114 is low, while using the power stored in the secondary battery 114 as much as possible.

The control circuit 118 inputs a control signal to the signal transmission part 119 to switch between a state in which the beacon signal is transmitted and a state in which the beacon signal is not transmitted. For example, the control circuit 118 causes the signal transmission part 119 to transmit the beacon signal when the sensor 117 detects that no person is using the measuring instrument 1, and causes the signal transmission part 119 not to transmit the beacon signal when the sensor 117 detects that a person is using the measuring instrument 1. This operation of the control circuit 118 prevents the beacon signal from being transmitted while a person is using the measuring instrument 1 and the measuring instrument 1 should not receive power, in a case where the wireless power transfer apparatus 2 performs wireless power transfer while receiving the beacon signal. As a result, the power consumption of the measuring instrument 1 can be reduced.

The signal transmission part 119 is a transmission part that transmits a beacon signal, and includes a signal modulation circuit 301 and a light emitting part 302. The signal modulation circuit 301 is a circuit for converting an electrical signal input from the control circuit 118 into an optical signal. The light emitting part 302 is a device that emits light on the basis of an instruction from the signal modulation circuit 301.

Figures 6A, 6B, 6C:
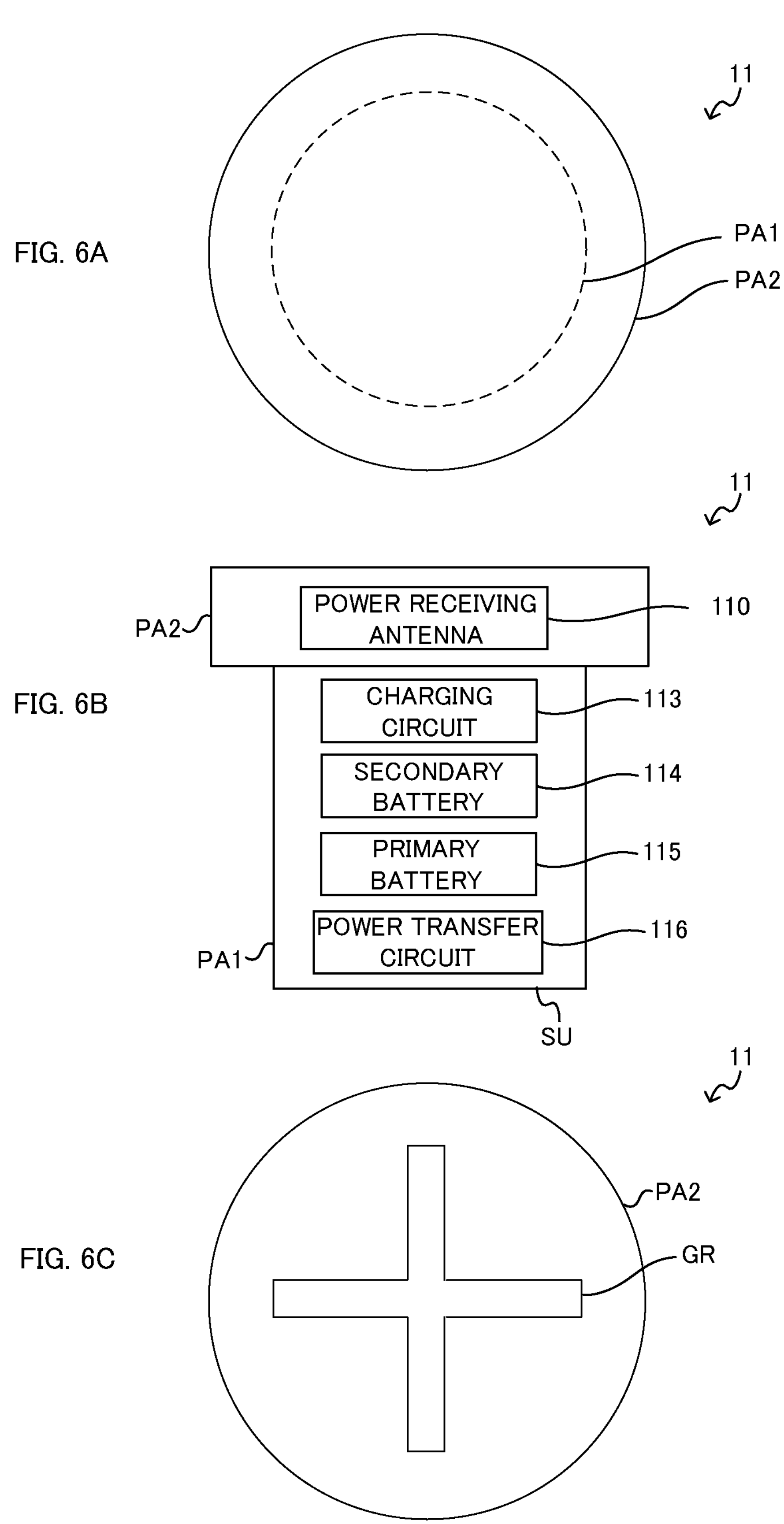
FIGS. 6A to 6C are schematic diagrams of the power receiving module 11.

FIGS. 6A to 6C are schematic diagrams of the power receiving module 11. FIG. 6A is a perspective view of the power receiving module 11, FIG. 6B is a front view of the power receiving module 11, and FIG. 6C is a top view of the power receiving module 11. As shown in FIG. 6A, the power receiving module 11 includes a first portion PA1 having the same shape as that of the standard battery B and a second portion PA2 having the same shape as that of the lid portion C. The first portion PA1 is not limited to having exactly the same shape as the standard battery B, as long as it has a shape that is substantially equivalent to the standard battery B and can be housed in the housing portion ST capable of housing the standard battery B. The second portion PA2 is not limited to having exactly the same shape as the lid portion C, as long as it has a shape that is substantially equivalent to the lid portion C capable of covering the standard battery B while the standard battery B is housed in the housing portion ST. As one example, the volume of the second portion PA2 may be larger than the volume of the lid portion C.

The first portion PA1 and the second portion PA2 have a cylindrical shape, for example. The diameter of the first portion PA1 is smaller than the diameter of the second portion PA2, since the first portion PA1 is a portion housed in the measuring instrument 1 and the second portion PA2 is a lid portion. Due to the power receiving module 11 having such a structure, the power receiving module 11 can be attached to the measuring instrument 1 instead of an existing button cell B.

In the front view shown in FIG. 6B, the power receiving antenna 110, the charging circuit 113, the secondary battery 114, the primary battery 115, and the power transfer circuit 116 are shown among the units of the power receiving module 11 shown in FIG. 5. The power receiving antenna 110 is provided in the second portion PA2, for example. As described above, by providing the power receiving antenna 110 in the second portion PA2 which is the lid portion of the measuring instrument 1, the power receiving antenna 110 is positioned along the surface of the measuring instrument 1, thereby making it easier for the measuring instrument 1 to receive wirelessly transferred power.

The charging circuit 113 is provided between the power receiving antenna 110 and the secondary battery 114 in the first portion PA1, for example. The secondary battery 114 and the primary battery 115 are provided between the charging circuit 113 and the power transfer circuit 116 in the first portion PA1, for example. The power transfer circuit 116 is positioned along a surface SU of the first portion PA1 opposite to a surface in contact with the second portion PA2, for example. As a result, power can be transferred from the power transfer circuit 116 to the electric circuit of the main body 12 when the power receiving module 11 is housed in the housing portion ST.

The primary battery 115 may be detachably provided in the power receiving module 11. This enables a flexible configuration in which the primary battery 115 is omitted when the storage capacity of the secondary battery 114 is high, and the primary battery 115 is provided when the storage capacity of the secondary battery 114 is low. For this purpose, an opening for attaching and detaching the primary battery 115 to and from the power receiving module 11 may be provided on a side surface of the power receiving module 11.

As shown in FIG. 6C, the groove GR for rotating the power receiving module 11 is provided in the second portion PA2 of the power receiving module 11. The operator can attach and detach the power receiving module 11 to and from the measuring instrument 1 by hooking a flat-blade screwdriver, fingernail, or the like in the groove GR and rotating the power receiving module 11. It should be noted that the measuring instrument 1 may be configured so that the power receiving module 11 can be attached to and detached from the measuring instrument 1 by pinching the side surface of the second portion PA2 of the power receiving module 11 with fingers and rotating the power receiving module 11.

Next, details of processing executed by the display part 122 and the controller 124 in the main body 12 will be described. The controller 124 includes a CPU that operates by executing a program, for example. The display part 122 uses the power of the primary battery 115 to display that charging of the secondary battery 114 is necessary when the remaining capacity of the secondary battery 114 is below the threshold value, on the basis of an instruction from the controller 124, for example. For instance, the display part 122 uses the power of the primary battery 115 to display a message "Charging is necessary" when the remaining capacity of the secondary battery 114 is below the second threshold value. Thus, the operator can temporarily suspend the operation and charge the secondary battery 114.

The controller 124 determines whether or not charging of the secondary battery 114 is necessary on the basis of the voltage output from the power receiving module 11, for example, and causes the display part 122 to display a message indicating that charging is necessary according to the determination result. Instead of displaying the message on the display, the controller 124 may turn on or flash the LED. This also applies to message display described later.

If the power receiving module 11 includes the primary battery 115, the controller 124 may acquire a signal indicating which of the secondary battery 114 and the primary battery 115 is outputting power, from the power receiving module 11. In this case, the controller 124 may determine whether or not charging of the secondary battery 114 is necessary on the condition that the secondary battery 114 is outputting power.

It should be noted that at least a part of the processing described as being performed by the control circuit 118 may be performed by the controller 124. In this case, the controller 124 transmits and receives a signal to and from the control circuit 118 to issue an instruction to the control circuit 118 or receive an instruction from the control circuit 118.

Figure 7:
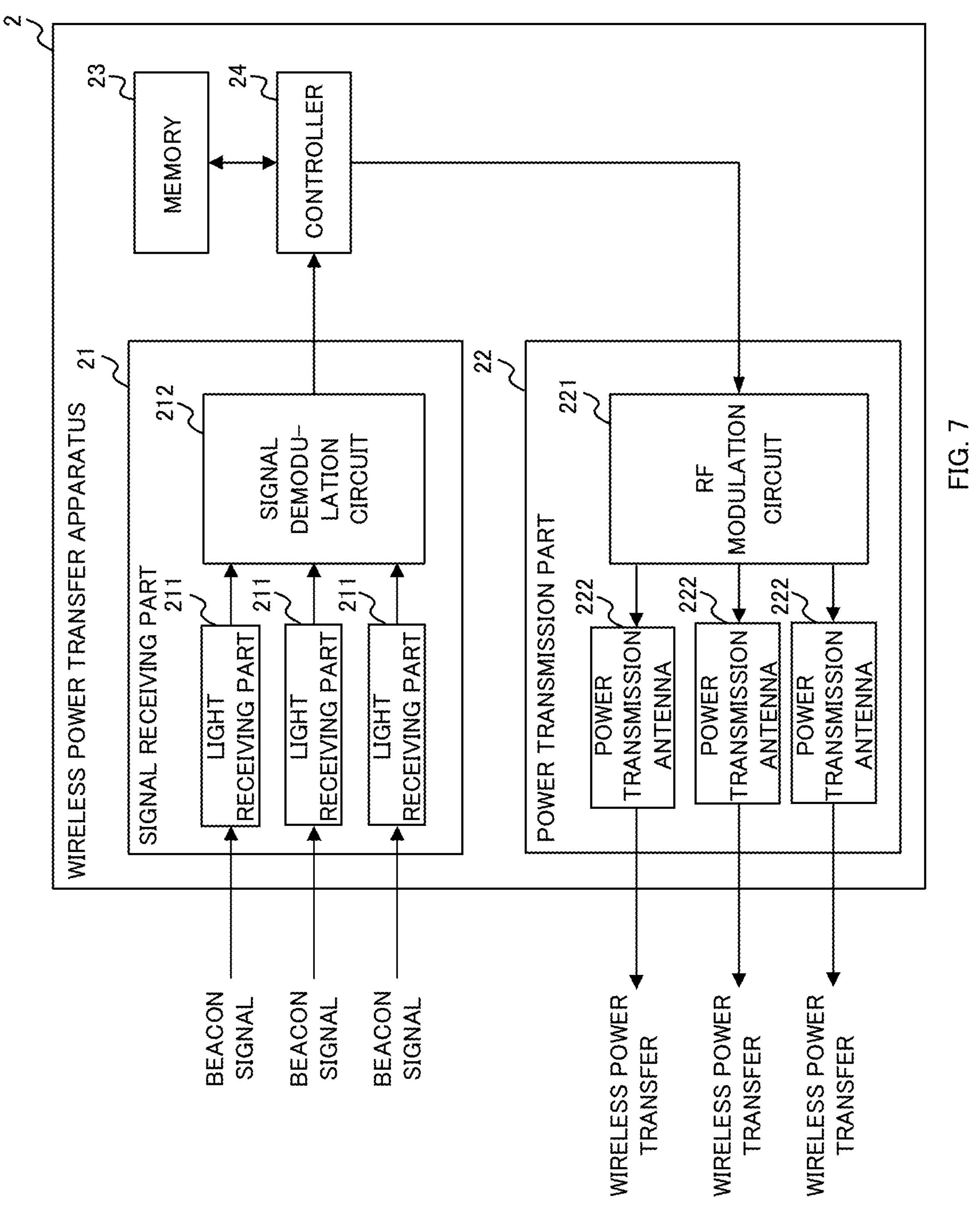
FIG. 7 shows an example of a configuration of a wireless power transfer apparatus 2.

[Configuration and operation of wireless power transfer apparatus 2]A configuration and operation of the wireless power transfer apparatus 2 will be described. FIG. 7 shows an example of the configuration of the wireless power transfer apparatus 2. The wireless power transfer apparatus 2 includes a signal receiving part 21, a power transmission part 22, a memory 23, and a controller 24.

The signal receiving part 21 is a receiving part that receives a beacon signal. The signal receiving part 21 includes a plurality of light receiving parts 211 and a signal demodulation circuit 212. The light receiving part 211 is a device that receives an optical beacon signal. The signal demodulation circuit 212 is a circuit that converts the optical signal input from the light receiving part 211 into an electrical signal, and inputs the converted electrical signal to the controller 24.

The power transmission part 22 is a physical device that transmits power wirelessly from the wireless power transfer apparatus 2. The power transmission part 22 includes an RF modulation circuit 221 and a plurality of power transmission antennas 222. The RF modulation circuit 221 is a circuit that modulates a signal input from the controller 24 into an RF signal, and inputs the modulated RF signal to the power transmission antenna 222. The power transmission antenna 222 is a physical device that transmits an RF signal carrying power transferred from an external power transfer or the like.

The memory 23 is a storage medium including a ROM, a RAM, and the like. The memory 23 stores a program executed by the controller 24.

The controller 24 is a CPU, for example. The controller 24 executes an information processing program stored in the memory 23 to cause the power transmission part 22 to transmit power when a condition for power transmission by the power transmission part 22 is satisfied.

[Effects of the Wireless Power Transfer System S]

As described above, in the wireless power transfer system S, the power receiving module 11, including the power receiving antenna 110 that receives wirelessly transferred power, can be attached to the existing measuring instrument 1 instead of a button cell. As a result, wireless power transfer can be achieved using the existing measuring instrument 1, allowing the operator to continue using the existing measuring instrument 1 as is, while eliminating the need for battery replacement and disposal.

<Suppressing Effect of Wireless Power Transfer on Human Body>

SUMMARY

When performing wireless power transfer to the measuring instrument 1, power is transmitted through space by being carried on a radio wave, and when a high-power radio wave is irradiated onto a person, it may affect the human body. Accordingly, in the wireless power transfer system S of the present embodiment, the wireless power transfer apparatus 2 transfers power to the measuring instrument 1 when the wireless power transfer apparatus 2 determines, on the basis of the beacon signal received from the measuring instrument 1, that a measuring instrument 1 in a state capable of receiving power is located within the predetermined distance from the wireless power transfer apparatus 2 and that no person is using the measuring instrument 1.

As a result, the wireless power transfer apparatus 2 can perform wireless power transfer to the measuring instrument 1 only when there is a target measuring instrument 1 for wireless power transfer and no person is using the measuring instrument 1, thereby suppressing the effect of wireless power transfer on the human body. Configurations and operations of the measuring instrument 1 and the wireless power transfer apparatus 2 will be described below.

[Configuration and Operation of Measuring Instrument 1]

Figure 8:
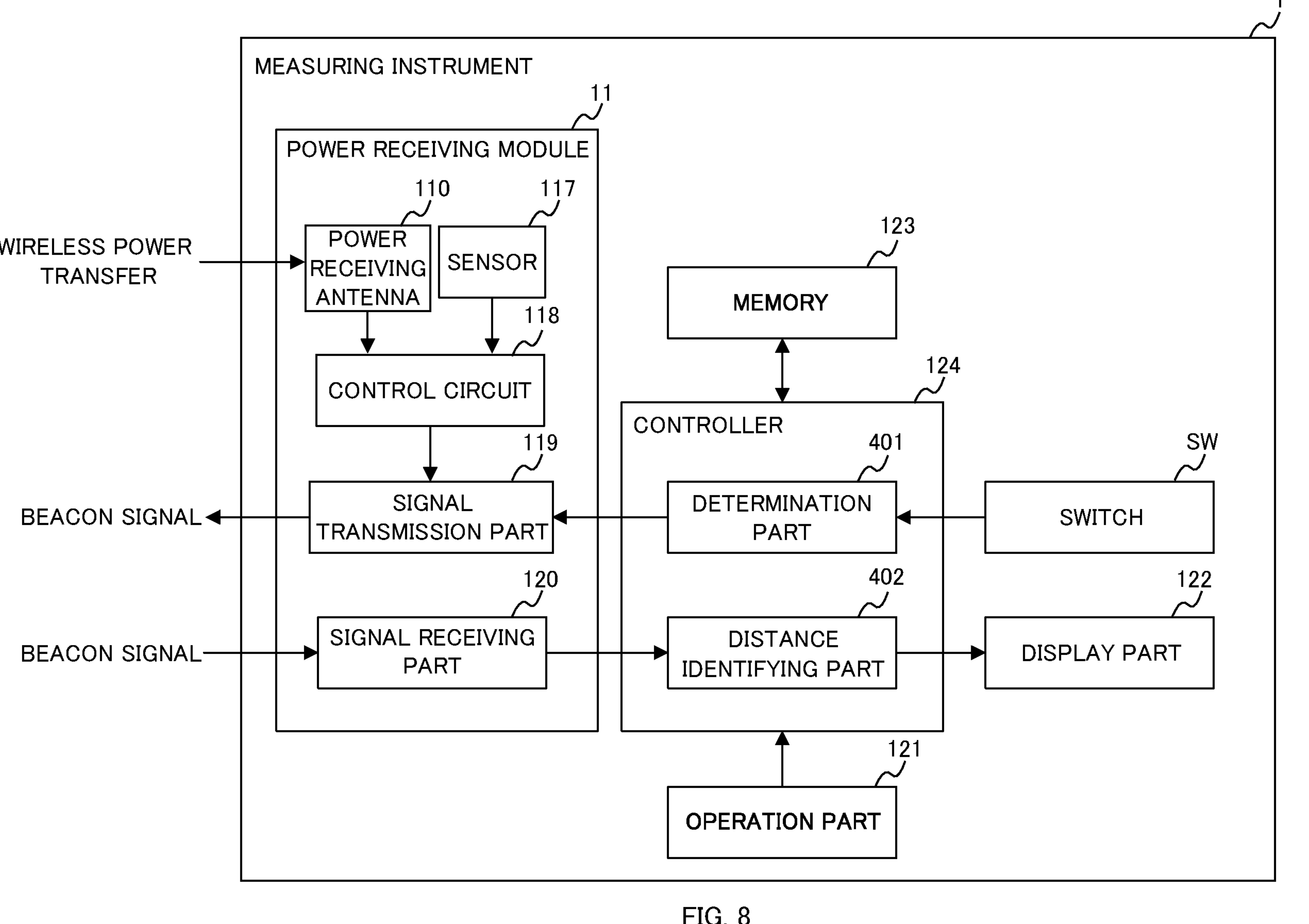
FIG. 8 shows another example of the configuration of the measuring instrument 1.

FIG. 8 shows another example of the configuration of the measuring instrument 1. The configuration of the measuring instrument 1 shown in FIG. 8 is different from the configuration of the measuring instrument 1 shown in FIG. 4 in that i) the controller 124 includes a determination part 401 and a distance identifying part 402 and ii) the measuring instrument 1 includes a switch SW and a signal receiving part 120.

If the remaining capacity of the secondary battery 114 is low, the measuring instrument 1 prompts the operator using the measuring instrument 1 to charge the secondary battery 114 by displaying that charging by wireless power transfer is necessary.

The display part 122 displays that the measuring instrument 1 can receive power when the remaining capacity of the secondary battery 114 of the power receiving module 11 is below the threshold value. The display part 122 displays a message such as "Charging is necessary. Please stop using and move away from the measuring instrument." when the remaining capacity of the secondary battery 114 is below the second threshold value. After displaying that message, the controller 124 of the measuring instrument 1 starts transmitting a beacon signal to start power reception.

It should be noted that the measuring instrument 1 may display a message prompting charging when the measuring instrument 1 is located at a position where it can be charged by the wireless power transfer apparatus 2. In order to determine whether or not the measuring instrument 1 is at the position where it can be charged by the wireless power transfer apparatus 2, the distance identifying part 402 identifies a distance from the wireless power transfer apparatus 2 to the measuring instrument 1. For example, the distance identifying part 402 identifies the distance from the wireless power transfer apparatus 2 to the measuring instrument 1 on the basis of the intensity of the beacon signal received by the signal receiving part 120 from the wireless power transfer apparatus 2. The display part 122 may display that power can be received when the distance identified by the distance identifying part 402 is equal to or less than a predetermined distance at which the measuring instrument 1 can receive power from the wireless power transfer apparatus 2.

As described above, the radio waves used for wireless power transfer may affect the human body. Accordingly, when no person is using the measuring instrument 1, the measuring instrument 1 transmits a beacon signal to the wireless power transfer apparatus 2, which starts power transfer when receiving a beacon signal, a power transfer request signal indicating that the measuring instrument 1 is in a state capable of receiving power.

The signal transmission part 119 transmits the beacon signal to the wireless power transfer apparatus 2 based on the sensor 117 detecting that no person is using the measuring instrument 1 as one of the conditions, and does not transmit the beacon signal to the wireless power transfer apparatus 2 when the sensor 117 detects that there is a person using the measuring instrument 1. If the sensor 117 is an acceleration sensor, the signal transmission part 119 transmits the beacon signal to the wireless power transfer apparatus 2 when the acceleration indicated by the signal input from the acceleration sensor is below a threshold value (for example, zero), for example, and does not transmit the beacon signal to the wireless power transfer apparatus 2 when the acceleration is not zero.

If the sensor 117 is a proximity sensor, the signal transmission part 119 transmits the beacon signal to the wireless power transfer apparatus 2 based on the condition that the signal input from the sensor 117 does not indicate that a person has been detected, as one of the conditions, for example. When the signal input from the sensor 117 indicates that a person has been detected, the signal transmission part 119 does not transmit the beacon signal to the wireless power transfer apparatus 2. It should be noted that, when the measuring instrument 1 includes both the acceleration sensor and the proximity sensor as the sensor 117, the beacon signal is transmitted to the wireless power transfer apparatus 2 based on the acceleration notified from the acceleration sensor being zero and the sensor 117 not detecting a person as one of the conditions.

As described above, the signal transmission part 119 transmits the beacon signal to the wireless power transfer apparatus 2 based on the sensor 117 detecting that no person is using the measuring instrument 1 as one of the conditions, thereby preventing the beacon signal from being transmitted during a time while a person is using the measuring instrument 1 and the measuring instrument 1 should not be receiving power, in a case where the wireless power transfer apparatus 2 performs wireless power transfer while receiving the beacon signal. As a result, the effect of wireless power transfer on the human body can be prevented.

Even when no person is using the measuring instrument 1, if an operator is around the measuring instrument 1, transmission of the radio waves carrying power from the wireless power transfer apparatus 2 to the measuring instrument 1 may affect the human body of the operator. Accordingly, if the sensor 117 is a human detection sensor, the signal transmission part 119 may transmit the beacon signal to the wireless power transfer apparatus 2 on condition that the human detection sensor does not detect a person within the predetermined distance from the measuring instrument 1.

The signal transmission part 119 may transmit a beacon signal as the power transfer request signal to the wireless power transfer apparatus 2 when i) the acceleration notified from the acceleration sensor is zero and ii) a detection signal indicating that a person is detected within the predetermined distance from the measuring instrument 1 is not input from the control circuit 118.

On the other hand, the signal transmission part 119 may be configured not to transmit the beacon signal to the wireless power transfer apparatus 2 when the human sensor detects a person located within the predetermined distance from the measuring instrument 1. The signal transmission part 119 may be configured not to transmit the beacon signal, as the power transfer request signal, to the wireless power transfer apparatus 2 when i) the acceleration notified from the acceleration sensor is not zero or ii) a detection signal indicating that a person is detected within the predetermined distance from the measuring instrument 1 is input from the control circuit 118.

As described above, the signal transmission part 119 does not transmit the beacon signal as the power transfer request signal to the wireless power transfer apparatus 2 when a person is located around the measuring instrument 1, even when no person is using the measuring instrument 1. This enables the wireless power transfer apparatus 2 to be prevented from transmitting the radio waves carrying power to the measuring instrument 1 when a person is around the measuring instrument 1. As a result, the effect of wireless power transfer on the human body can be suppressed.

The signal transmission part 119 may transmit the beacon signal on condition that the remaining capacity of the secondary battery 114 is below the threshold value. For example, the signal transmission part 119 may transmit the beacon signal when it is detected that no person is using the measuring instrument 1 and the remaining capacity of the secondary battery 114 is below the threshold value. The measuring instrument 1 transmits the beacon signal only when wireless power transfer should be performed, thereby reducing the power consumption of the measuring instrument 1.

When it is detected that a person is using the measuring instrument 1, the signal transmission part 119 may transmit a beacon signal indicating that the measuring instrument 1 is not in a state capable of receiving power or that a person is using the measuring instrument 1. In this case, the wireless power transfer apparatus 2 performs wireless power transfer on the condition that the wireless power transfer apparatus 2 does not receive the beacon signal, thereby preventing the wireless power transfer from affecting the human body.

In the above description, it has been exemplified that the signal transmission part 119 transmits the beacon signal when the distance identified by the distance identifying part 402 is equal to or less than the distance at which the measuring instrument 1 can receive power from the wireless power transfer apparatus 2, but the signal transmission part 119 may transmit the beacon signal in response to the operation of the operator for receiving power. Specifically, the signal transmission part 119 may transmit the beacon signal indicating that the measuring instrument 1 is in a state capable of receiving power to the wireless power transfer apparatus 2 in response to the operation part 121 receiving a power reception operation for starting power reception. As described above, since the measuring instrument 1 transmits the beacon signal once every few seconds, the signal transmission part 119 may use, for example, the beacon signal transmitted after the operation for receiving power is performed as the beacon signal indicating that the measuring instrument 1 is in a state capable of receiving power. By enabling a manual power transfer instruction in this manner, the measuring instrument 1 becomes more user-friendly for the operator.

It should be noted that, in a case where the power receiving module 11 is not attached to the measuring instrument 1 and the measuring instrument 1 operates with the power transferred by the standard battery B, the measuring instrument 1 does not need to receive power from the wireless power transfer apparatus 2. Therefore, in order to enable operation to vary depending on whether or not the power receiving module 11 is attached to the measuring instrument 1, the determination part 401 determines which of the standardized standard battery B or the power receiving module 11 is housed in the measuring instrument 1.

In order to enable the determination part 401 to determine which of the standard battery B or the power receiving module 11 is housed in the measuring instrument 1, the second portion PA2, which is the lid-side portion of the power receiving module 11, has a structure different from that of the lid portion C, which covers the standard battery B, while still functioning as a battery lid, for example. Specifically, a switch SW is provided in the housing portion ST of the measuring instrument 1, and the second portion PA2 is configured to press the switch SW when the second portion PA2 is housed in the housing portion ST. In other words, the switch SW, which cannot be pressed with the lid portion C for the standard battery B but can be pressed with the second portion PA2 of the power receiving module 11, is provided in the housing portion ST of the measuring instrument 1. Thus, the determination part 401 can determine that the standard battery B is housed in the measuring instrument 1 when the switch SW is not pressed, and determine that the power receiving module 11 is housed in the measuring instrument 1 when the switch SW is pressed.

When the determination part 401 determines that the standard battery B is housed in the measuring instrument 1, the measuring instrument 1 operates with the power of the standard battery B, and thus does not display a message prompting charging and does not transmit the beacon signal as the power transfer request signal to the wireless power transfer apparatus 2. On the other hand, when the determination part 401 determines that the power receiving module 11 is housed in the measuring instrument 1, the measuring instrument 1 operates with the power charged in the secondary battery 114 of the power receiving module 11, and thus displays a message prompting charging and transmits the beacon signal as the power transfer request signal to the wireless power transfer apparatus 2.

[Configuration and Operation of Wireless Power Transfer Apparatus 2]

Figure 9:
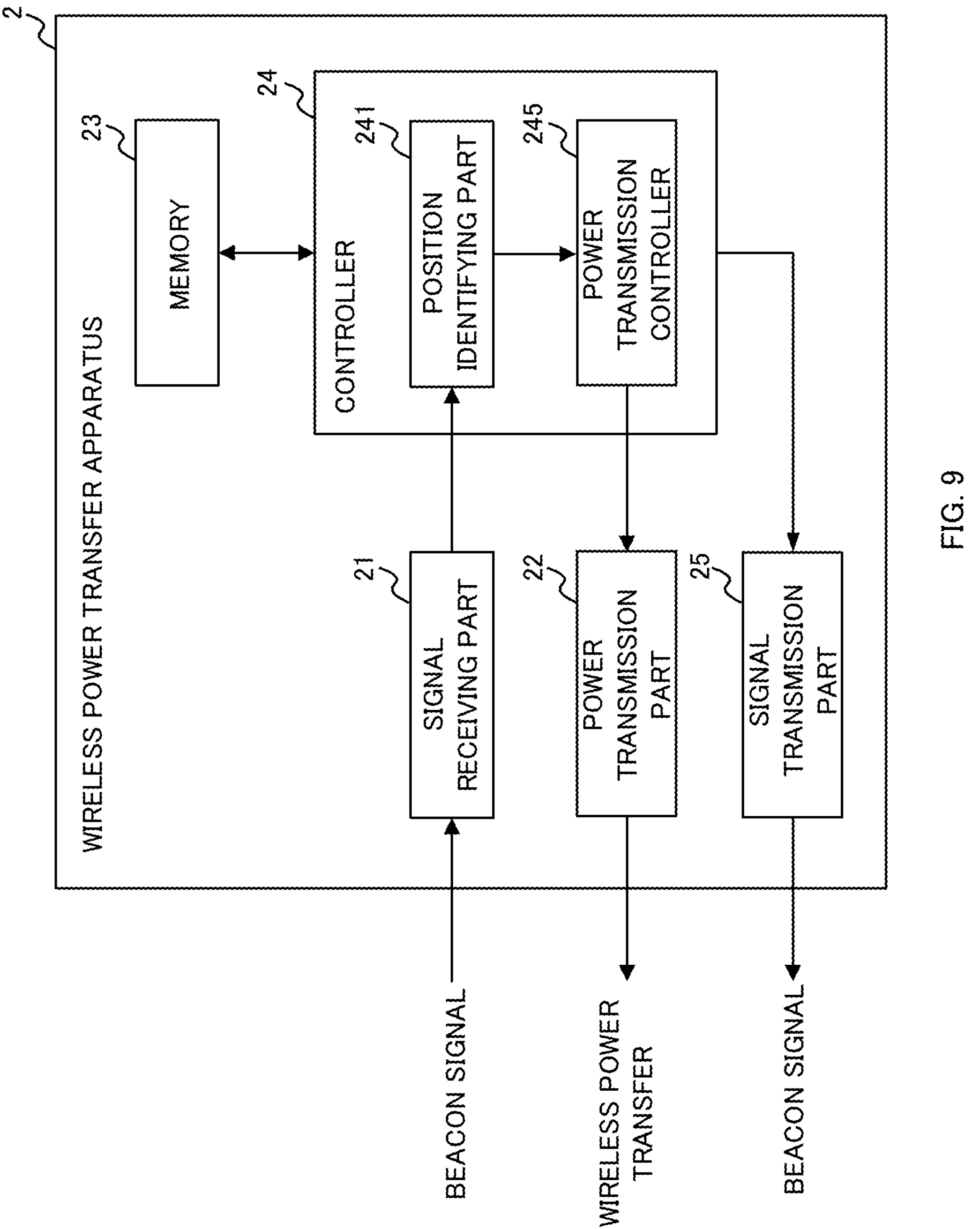
FIG. 9 shows another example of the configuration of the wireless power transfer apparatus 2.

FIG. 9 shows another example of the configuration of the wireless power transfer apparatus 2. The configuration of the wireless power transfer apparatus 2 shown in FIG. 9 is different from the configuration of the wireless power transfer apparatus 2 shown in FIG. 7 in that i) the controller 24 includes a position identifying part 241 and a power transmission controller 245 as a specific configuration, and the wireless power transfer apparatus 2 includes a signal transmission part 25.

The signal receiving part 21 receives the beacon signal (for example, the power transfer request signal) indicating a state of the measuring instrument 1 from the measuring instrument 1. The state of the measuring instrument 1 refers to, for example, i) a state in which the measuring instrument 1 requires charging and is located within a predetermined distance from the wireless power transfer apparatus 2, and no person is in the vicinity of the measuring instrument 1, or ii) a state in which the measuring instrument 1 has received an operation input for starting power reception.

The memory 23 stores power transferable area data indicating a power transferable area in which power can be transferred wirelessly. The power transferable area is defined by the direction in which the power transferable area is located and the distance to the power transferable area, on the basis of the position of the wireless power transfer apparatus 2.

The position identifying part 241 identifies a position of the measuring instrument 1 on the basis of the beacon signal received by the signal receiving part 21 from the measuring instrument 1. The position identifying part 241 identifies the direction in which the measuring instrument 1 is located and the distance to the measuring instrument 1 as a relative position of the measuring instrument 1 with reference to the position of the wireless power transfer apparatus 2, on the basis of the direction and intensity of a beacon signal received by the signal receiving part 21 from the measuring instrument 1, for example.

The position identifying part 241 identifies the distance from the wireless power transfer apparatus 2 to the measuring instrument 1 on the basis of the intensity of the beacon signal received by the signal receiving part 21, for example. Further, the position identifying part 241 identifies the direction of the measuring instrument 1 with respect to the wireless power transfer apparatus 2, on the basis of the difference in timing at which each of the plurality of light receiving parts 211 included in the signal receiving part 21 receives the beacon signal.

Specifically, if the plurality of light receiving parts 211 simultaneously receive the beacon signal, the position identifying part 241 identifies that the measuring instrument 1 is on an intermediate line extending in a direction perpendicular to a straight line connecting the plurality of light receiving parts 211, starting from the midpoint between the plurality of light receiving parts 211. If the timing at which one light receiving part 211 receives the beacon signal is earlier than the timing at which the other light receiving part 211 receives the beacon signal, the position identifying part 241 identifies that the measuring instrument 1 is located in a direction closer to the one light receiving part 211 than the intermediate line.

The power transmission controller 245 causes the power transmission part 22 to transmit power when it is determined that the measuring instrument 1 is located within the predetermined distance from the wireless power transfer apparatus 2 and that no person is using the measuring instrument 1, on the basis of the beacon signal received by the signal receiving part 21 from the measuring instrument 1. The power transmission controller 245 causes the power transmission part 22 to transmit power, for example, when the signal receiving part 21 is receiving a beacon signal and it is determined, on the basis of the intensity of the received beacon signal, that the measuring instrument 1 is within a distance at which the measuring instrument 1 can receive power from the wireless power transfer apparatus 2.

As described above, when the measuring instrument 1 is located within the distance at which the wireless power transfer apparatus 2 can transfer power wirelessly and no person is using the measuring instrument 1, the wireless power transfer apparatus 2 transfers power wirelessly to the measuring instrument 1, thereby suppressing the effect of wireless power transmission on the human body. However, even in this case, it is not preferable that the wireless power transfer apparatus 2 performs wireless power transfer when the measuring instrument 1 is located in an area commonly occupied by a person.

Accordingly, the power transmission controller 245 does not cause the power transmission part 22 to transmit power when the measuring instrument 1 is located outside the power transferable area where power can be transferred wirelessly, even if the measuring instrument 1 is located within the predetermined distance from the wireless power transfer apparatus 2 and that no person is using the measuring instrument 1. For example, the power transmission controller 245 does not cause the power transmission part 22 to transmit power when the relative position of the measuring instrument 1 with respect to the position of the wireless power transfer apparatus 2, identified by the position identifying part 241, is located outside the power transferable area with reference to the position of the wireless power transfer apparatus 2, as indicated by the power transferable area data stored in the memory 23. In this manner, the power transmission controller 245 causes the power transmission part 22 not to transmit power when the measuring instrument 1 is located in an area commonly occupied by a person, thereby preventing the power transmission part 22 from transmitting power in a state where there is a high probability that a person is near the measuring instrument 1.

Even when the measuring instrument 1 is located within the distance at which the wireless power transfer apparatus 2 can transfer power wirelessly and no person is using the measuring instrument 1, it is not preferable for the wireless power transfer apparatus 2 to initiate wireless power transfer to the measuring instrument 1 immediately after an operator stops using the measuring instrument 1 because the operator is likely to be near the measuring instrument 1, which may result in the radio waves carrying power being radiated onto the operator, for example.

Accordingly, the power transmission controller 245 does not cause the power transmission part 22 to transmit power within a predetermined time after the signal receiving part 21 receives the beacon signal from the measuring instrument 1, even if it is determined that the measuring instrument 1 is located within the predetermined distance from the wireless power transfer apparatus 2 and that no person is using the measuring instrument 1. The power transmission controller 245 prevents the power transmission part 22 from transmitting power during a second time period after receiving a beacon signal for the first time following the lapse of a first time period in which no beacon signal has been received, for example. The power transmission controller 245 causes the power transmission part 22 to start power transmission after a time (for example, one minute) required for the operator using the measuring instrument 1 to move at least a predetermined distance away from the measuring instrument 1 has elapsed since the signal receiving part 21 received a beacon signal indicating that the measuring instrument 1 is in a state capable of receiving power, for instance.

This prevents the wireless power transfer apparatus 2 from wirelessly transferring power to the measuring instrument 1 before the operator leaves the vicinity of the measuring instrument 1 after the operator stops using the measuring instrument 1, thereby ensuring safety of the operator.

[Processing in Wireless Power Transfer Apparatus 2]

Figure 10:
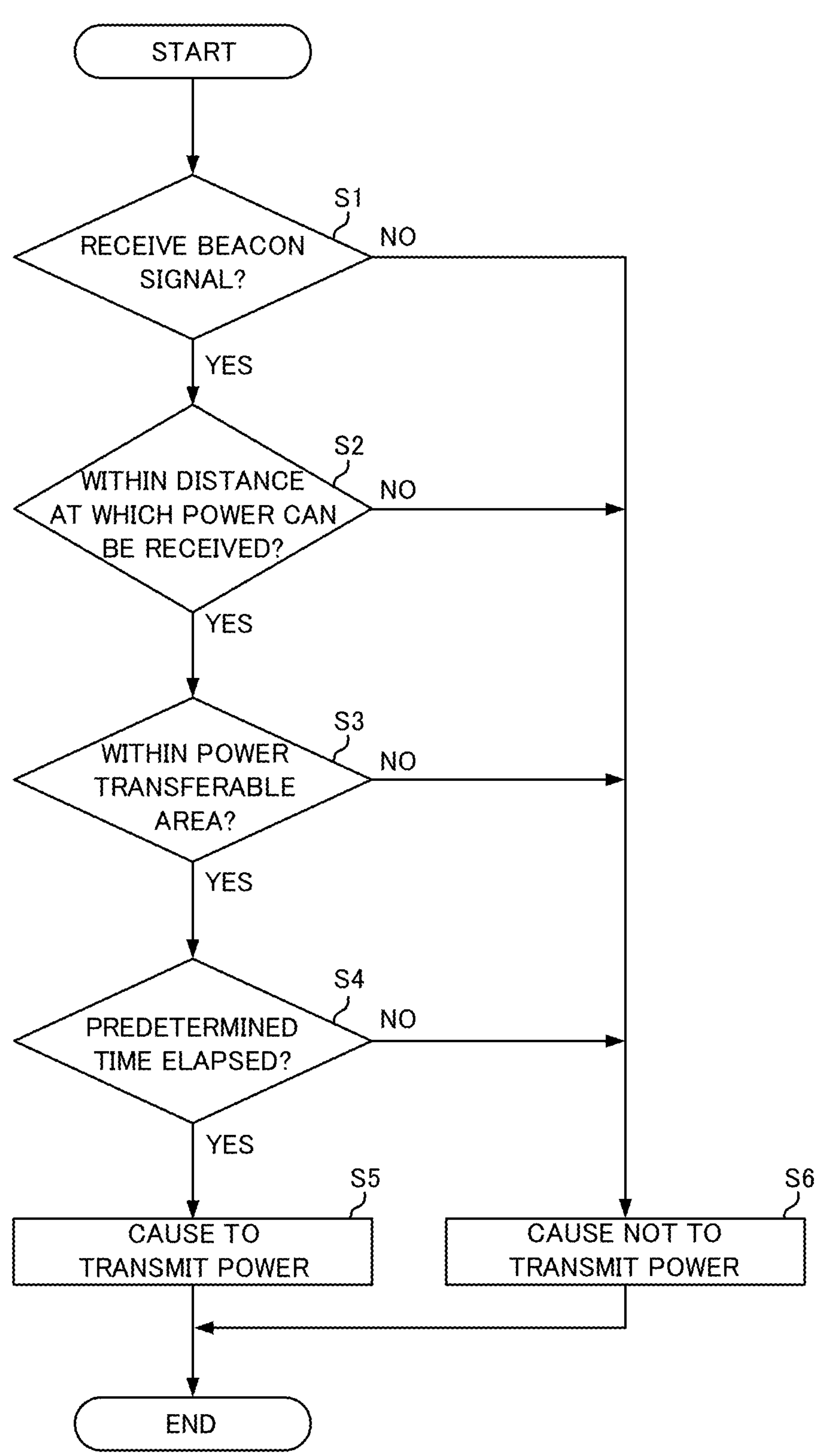
FIG. 10 is a flowchart illustrating processing executed by the wireless power transfer apparatus 2.

Processing executed by the wireless power transfer apparatus 2 will be described. FIG. 10 is a flowchart illustrating the processing executed by the wireless power transfer apparatus 2.

The power transmission controller 245 determines whether or not the signal receiving part 21 receives the beacon signal from the measuring instrument 1 (S1). If the power transmission controller 245 determines that the beacon signal is not received (S1: NO), the process proceeds to step S6.

On the other hand, if the power transmission controller 245 determines that the beacon signal is received (S1: YES), the power transmission controller 245 determines whether or not the measuring instrument 1 is located within the distance at which the measuring instrument 1 can receive power from the wireless power transfer apparatus 2 (S2). If the power transmission controller 245 determines that the measuring instrument 1 is not within the distance at which the measuring instrument 1 can receive power from the wireless power transfer apparatus 2 (S2: NO), the process proceeds to step S6.

On the other hand, if the power transmission controller 245 determines that the measuring instrument 1 is located within the distance at which the measuring instrument 1 can receive power from the wireless power transfer apparatus 2 (S2: YES), the power transmission controller 245 determines whether the measuring instrument 1 is located within the power transferable area in which power can be transferred wirelessly (S3). If the power transmission controller 245 determines that the measuring instrument 1 is not located within the power transferable area (S3: NO), the process proceeds to step S6.

On the other hand, if the power transmission controller 245 determines that the measuring instrument 1 is located within the power transferable area (S3: YES), the power transmission controller 245 determines whether the predetermined time has elapsed since the beacon signal is received (S4). If the power transmission controller 245 determines that the predetermined time has not elapsed since the reception of the beacon signal (S4: NO), the process proceeds to step S6.

On the other hand, if the power transmission controller 245 determines that the predetermined time has elapsed from the reception of the beacon signal (S4: YES), the power transmission controller 245 causes the power transmission part 22 to transmit power (S5).

If the power transmission controller 245 determines NO in step S1, S2, S3, or S4, the power transmission controller 245 causes the power transmission part 22 not to transmit power (S6).

Modified Example

In the example described above, the signal transmission part 119 transmits the beacon signal to the wireless power transfer apparatus 2 when the sensor 117 detects that no person is using the measuring instrument 1, but the signal transmission part 119 may transmit a beacon signal indicating the presence or absence of a person using the measuring instrument 1 detected by the sensor 117, to the wireless power transfer apparatus 2. That is, the signal transmission part 119 may continuously transmit the beacon signal to the wireless power transfer apparatus 2 regardless of whether or not a person is using the measuring instrument 1. In this case, the transmitted beacon signal includes information for identifying the presence or absence of a person using the measuring instrument 1.

In this case, the power transmission controller 245 of the wireless power transfer apparatus 2 causes the power transmission part 22 to transmit power when i) the measuring instrument 1 is determined to be located within the predetermined distance from the wireless power transfer apparatus 2, on the basis of the intensity of the beacon signal received by the signal receiving part 21 from the measuring instrument 1 and also ii) the beacon signal received by the signal receiving part 21 from the measuring instrument 1 is determined to include information indicating that no person is using the measuring instrument 1.

In addition, in a case where the sensor 117 is a human sensor, the signal transmission part 119 may transmit the beacon signal indicating the presence or absence of a person around the measuring instrument 1 as detected by the human sensor, to the wireless power transfer apparatus 2. That is, the signal transmission part 119 may continuously transmit the beacon signal to the wireless power transfer apparatus 2 regardless of whether or not a person is around the measuring instrument 1. In this case, the transmitted beacon signal includes information for identifying the presence or absence of a person around the measuring instrument 1.

The power transmission controller 245 of the wireless power transfer apparatus 2 that has received the beacon signal causes the power transmission part 22 to transmit power when i) the measuring instrument 1 is determined to be located within the predetermined distance from the wireless power transfer apparatus 2 on the basis of the intensity of the received beacon signal and also ii) the received beacon signal is determined to include information indicating that no person is using the measuring instrument 1 and information indicating that no person is around the measuring instrument 1.

[Effects of Wireless Power Transfer System S]

As described above, in the wireless power transfer system S, when the power transmission controller 245 determines that the measuring instrument 1 is located within the predetermined distance from the wireless power transfer apparatus 2 and that no person is using the measuring instrument 1 on the basis of the beacon signal received by the wireless power transfer apparatus 2 from the measuring instrument 1, the wireless power transfer apparatus 2 can transmit power to the measuring instrument 1. This makes it possible to suppress the effect of wireless power transmission on the human body of the operator.

In addition, in the wireless power transfer system S, the power transmission controller 245 can prevent the power transmission part 22 from transmitting power when the measuring instrument 1 is in an area commonly occupied by a person. This prevents the power transmission part 22 from transmitting power while the measuring instrument 1 is placed in a location where there is a high probability of a person being present, thereby enhancing safety.

<Improve Efficiency of Wireless Power Transfer>

SUMMARY

The operator performs work while holding the measuring instrument 1 in his/her hand, and thus, the orientation of the measuring instrument 1 may change. Further, when the measuring instrument 1 is placed on a desk or floor, the orientation of the measuring instrument 1 may differ before and after the work. Depending on the orientation of the measuring instrument 1, the distance between the wireless power transfer apparatus 2 and the power receiving antenna of the measuring instrument 1 may increase, or the power receiving antenna may be hidden behind the main body 12 of the measuring instrument 1 from the perspective of the wireless power transfer apparatus 2. As a result, it becomes difficult for the measuring instrument 1 to receive the power transferred from the wireless power transfer apparatus 2, and the power transfer efficiency may decrease.

Therefore, the measuring instrument 1 may include the plurality of power receiving antennas 110. The wireless power transfer apparatus 2 identifies respective positions of the plurality of power receiving antennas 110 on the basis of posture data indicating the posture of the measuring instrument 1 received from the measuring instrument 1, and causes the power transmission antenna 222 to transmit power to the power receiving antenna 110 that can receive the largest amount of power among the identified power receiving antennas 110, thereby improving the power transfer efficiency. Configurations and operations of the measuring instrument 1 and the wireless power transfer apparatus 2 will be described below.

[Configuration and Operation of Measuring Instrument 1]

Figure 11:
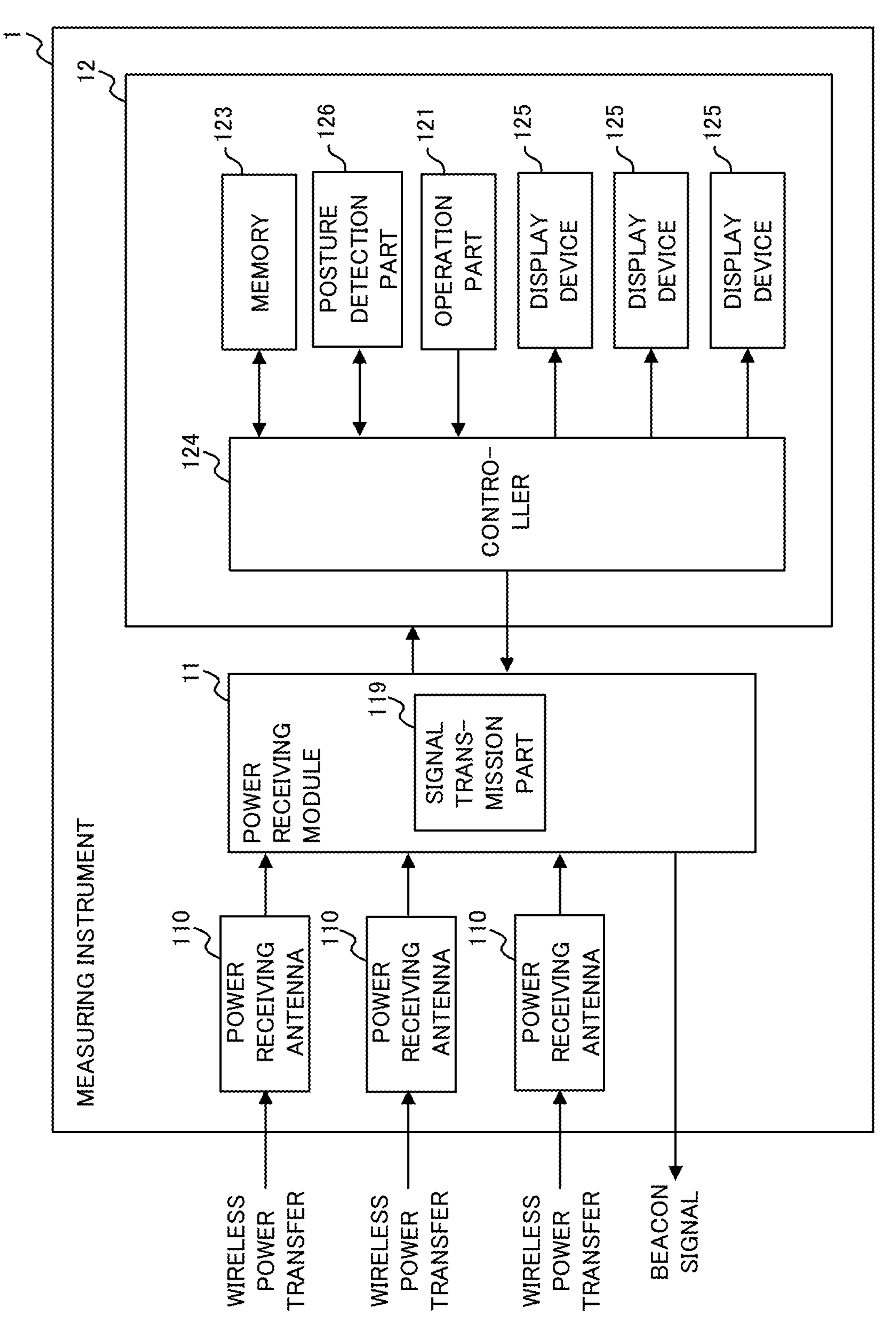
FIG. 11 shows another example of the configuration of the measuring instrument 1.

FIG. 11 shows another example of the configuration of the measuring instrument 1. The measuring instrument 1 shown in FIG. 11 is different from the measuring instrument 1 shown in FIG. 4 in that the measuring instrument 1 shown in FIG. 11 further includes the plurality of power receiving antennas 110, a plurality of display devices 125, and a posture detection part 126.

In FIG. 11, the plurality of power receiving antennas 110 are shown outside the main body 12, but the plurality of power receiving antennas 110 may be built in the main body 12. The power receiving module 11 shown in FIG. 11 may include some of the power receiving antennas 110 among the plurality of power receiving antennas 110, but may be configured not to include the power receiving antennas 110.

The plurality of power receiving antennas 110 are pattern antennas coupled to the power receiving module 11 by Q-type matching, for example. The power receiving module 11 includes a selection circuit that selects the power receiving antenna 110 that has received the strongest power and achieves the highest power transfer efficiency, among the plurality of power receiving antennas 110. The selection circuit selects the power receiving antenna 110 to be used for receiving power on the basis of the control of the control circuit 118 shown in FIG. 8, for example.

A plurality of display devices 125 are provided so as to respectively correspond to the plurality of power receiving antennas 110. Among the plurality of display devices 125, the display device 125 corresponding to the power receiving antenna 110 that is receiving power transmitted by the power transmission antenna 222 displays that power is being received. The display device 125 is an LED, for example. The controller 124 compares the power received from the power receiving antenna 110 with a threshold value, and turns on the LED corresponding to the power receiving antenna 110 receiving power whose amount of power is equal to or higher than the threshold value.

In this way, the display device 125 corresponding to the power receiving antenna 110 that is receiving power indicates that power is being received, allowing the operator to recognize that the measuring instrument 1 is receiving power and which of the power receiving antennas 110 is receiving power.

The posture detection part 126 includes a gyro sensor, for example, and detects the posture of the measuring instrument 1 by measuring the angular velocity of the measuring instrument 1. The posture of the measuring instrument 1 is represented by, for example, a roll angle, a pitch angle, and a yaw angle with respect to an initial posture in which the measuring instrument 1 is placed on the upper surface of the wireless power transfer apparatus 2 at a predetermined angle. As one example, the controller 124 notifies the posture detection part 126 that an operation for setting an initial posture has been performed on the operation part 121, and the posture detection part 126 inputs to the controller 124 data indicating a roll angle, a pitch angle, and a yaw angle with reference to the posture of the posture detection part 126 at the time of receiving the notification.

The posture detection part 126 transmits the posture data to the wireless power transfer apparatus 2 via the power receiving module 11. Specifically, the signal transmission part 119 included in the power receiving module 11 transmits a beacon signal including information indicating the posture detected by the posture detection part 126. After the signal transmission part 119 transmits the beacon signal, any of the plurality of power receiving antennas 110 receives power from the wireless power transfer apparatus 2.

As will be described later in detail, the wireless power transfer apparatus 2 that has received the beacon signal identifies the power receiving antenna 110 to be a power transmission target on the basis of the posture of the measuring instrument 1 indicated by the received beacon signal. The identified power receiving antenna 110 receives the power transferred from the wireless power transfer apparatus 2.

[Configuration and Operation of Wireless Power Transfer Apparatus 2]

Figure 12:
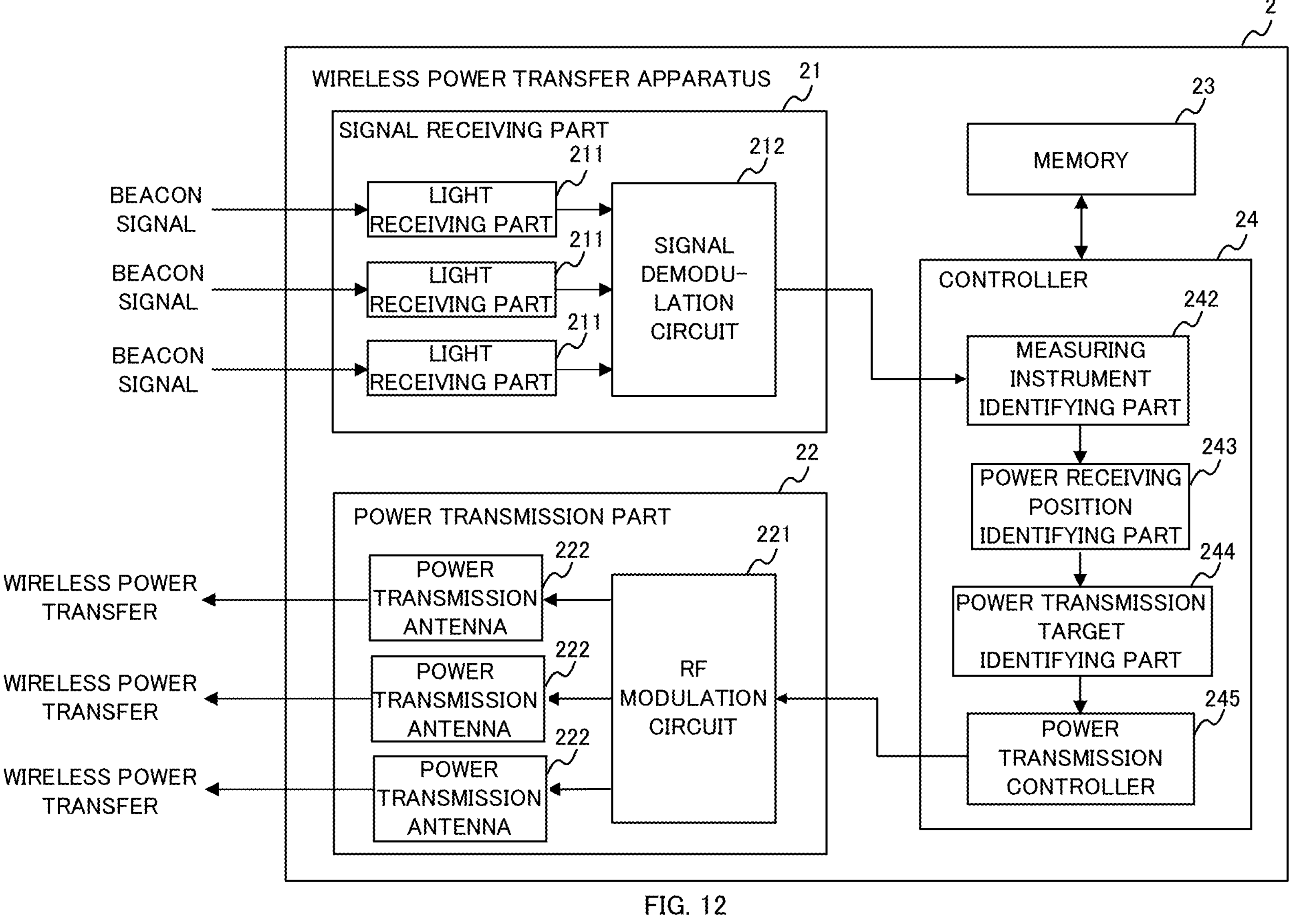
FIG. 12 shows another example of the configuration of the wireless power transfer apparatus 2.

The configuration and operation of the wireless power transfer apparatus 2 will be described. FIG. 12 shows another example of the configuration of the wireless power transfer apparatus 2. The configuration of the wireless power transfer apparatus 2 shown in FIG. 12 is different from the configuration of the wireless power transfer apparatus 2 shown in FIG. 7 in that the controller 24 includes a measuring instrument identifying part 242, a power receiving position identifying part 243, a power transmission target identifying part 244, and a power transmission controller 245 as a specific configuration.

The memory 23 stores shape data indicating the shape of the measuring instrument 1. The shape of the measuring instrument 1 is a three-dimensional shape of the main body of the measuring instrument 1, for example. As will be described later in detail, the shape data is used by the wireless power transfer apparatus 2 to identify the position of the power receiving antenna 110 that is not hidden behind the main body of the measuring instrument 1. Further, the memory 23 stores positional relationship data indicating the positional relationship between the plurality of power receiving antennas 110 in the measuring instrument 1. The positional relationship data is, for example, data indicating coordinates of the plurality of power receiving antennas 110 in a three-dimensional coordinate space having the signal transmission part 119 of the power receiving module 11 as an origin.

The measuring instrument identifying part 242 identifies the position of the signal transmission part 119 in the measuring instrument 1 that transmits the beacon signal relative to the wireless power transfer apparatus 2, on the basis of the beacon signal received by the signal receiving part 21. The measuring instrument identifying part 242 identifies the distance from the wireless power transfer apparatus 2 to the signal transmission part 119 of the measuring instrument 1 on the basis of the intensity of the beacon signal received by the signal receiving part 21, for example. In addition, the measuring instrument identifying part 242 identifies the direction of the signal transmission part 119 in the measuring instrument 1 relative to the wireless power transfer apparatus 2, on the basis of a difference in timing at which each of the plurality of light receiving parts 211 included in the signal receiving part 21 receives the beacon signal, for example.

Specifically, when the plurality of light receiving parts 211 simultaneously receive the beacon signal, the measuring instrument identifying part 242 identifies that the signal transmission part 119 of the measuring instrument 1 is on an intermediate line extending in a direction perpendicular to a straight line connecting the plurality of light receiving parts 211, starting from the midpoint between the plurality of light receiving parts 211. When the timing at which one light receiving part 211 receives the beacon signal is earlier than the timing at which the other light receiving part 211 receives the beacon signal, the measuring instrument identifying part 242 identifies that the signal transmission part 119 of the measuring instrument 1 is located in a direction closer to the one light receiving part 211 than the intermediate line.

The measuring instrument identifying part 242 identifies the posture of the measuring instrument 1 on the basis of the beacon signal received by the signal receiving part 21. For example, the measuring instrument identifying part 242 identifies the orientation of the measuring instrument 1 in the device coordinate system referenced to the position of the wireless power transfer apparatus 2, on the basis of the information indicating the posture of the measuring instrument 1 included in the beacon signal received by the signal receiving part 21.

The power receiving position identifying part 243 identifies the respective positions of the plurality of power receiving antennas 110 on the basis of i) the positional relationship data indicating the positional relationship between the signal transmission part 119 and each of the plurality of power receiving antennas 110 in the measuring instrument 1, ii) the position of the signal transmission part 119 identified by the measuring instrument identifying part 242, and iii) the posture of the measuring instrument 1. The power receiving position identifying part 243 identifies the respective positions of the plurality of power receiving antennas 110 every time the signal receiving part 21 receives the beacon signal including information indicating the posture, for example. A method for the power receiving position identifying part 243 to identify the positions of the plurality of power receiving antennas 110 will be specifically described below.

First, the power receiving position identifying part 243 generates a plurality of correction vectors by correcting, on the basis of the posture of the measuring instrument 1, a plurality of vectors indicating the positions of the plurality of power receiving antennas 110, indicated by the positional relationship data, with respect to the position of the signal transmission part 119 in the measuring instrument coordinate system referenced to the position of the measuring instrument 1. The plurality of correction vectors are a plurality of vectors indicating the positions of the plurality of power receiving antennas 110 with respect to the position of the signal transmission part 119 in the device coordinate system referenced to the position of the wireless power transfer apparatus 2.

Figure 13:
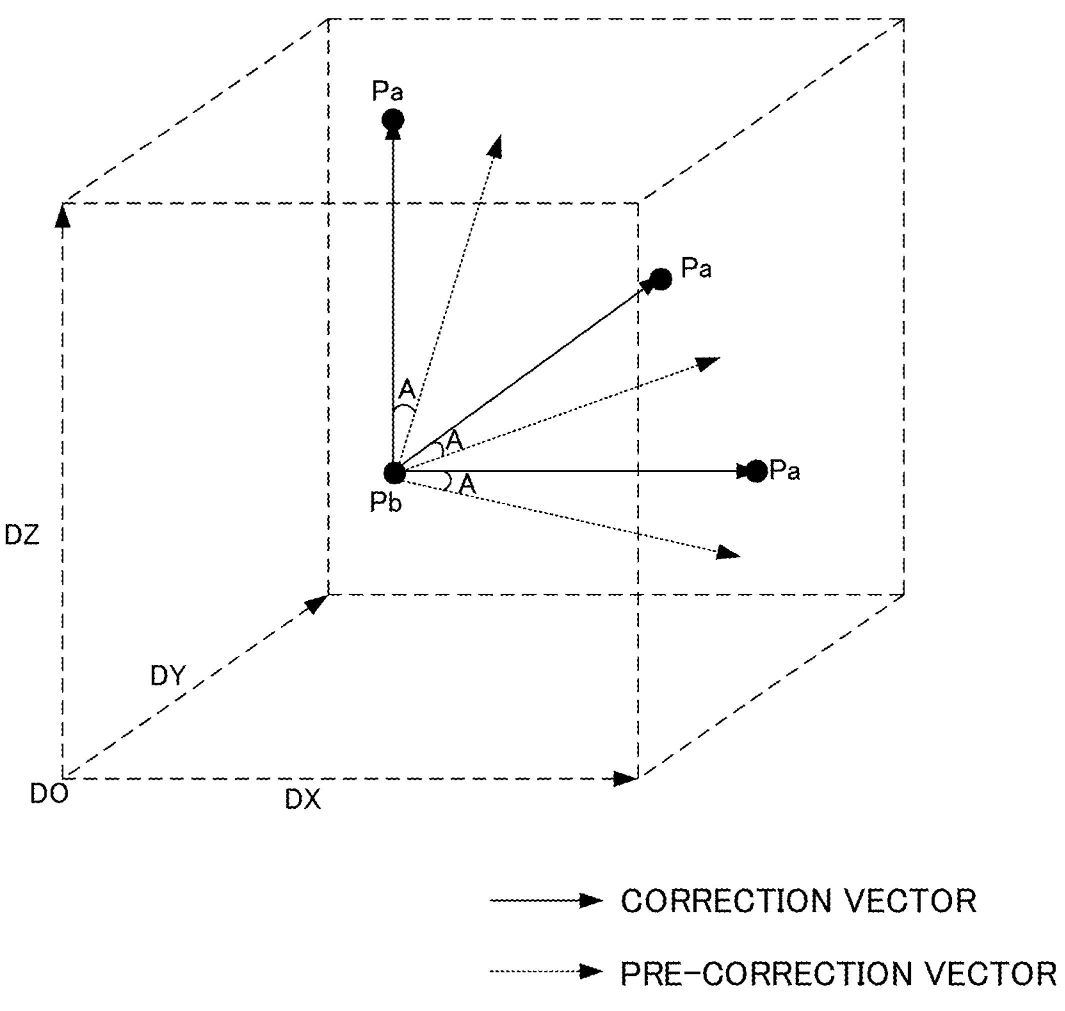
FIG. 13 shows an example of generation of a correction vector.

FIG. 13 shows an example of generation of the correction vector. The device coordinate system shown in FIG. 13 is a three-dimensional coordinate system defined by three axes (DX, DY, and DZ) with an arbitrary point (DO) in the wireless power transfer apparatus 2 as an origin. It is assumed that the posture of the measuring instrument 1 after the posture change is inclined by A degrees in the device coordinate system with respect to the posture before the posture change. In this case, as shown in FIG. 13, the power receiving position identifying part 243 generates correction vectors (indicated by dotted arrows) by rotating pre-correction vectors (indicated by solid arrows), indicating positions Pa of the plurality of power receiving antennas 110 with respect to a position Pb of the signal transmission part 119 in the measuring instrument coordinate system, by A degrees.

Next, the power receiving position identifying part 243 identifies the respective positions of the plurality of power receiving antennas 110 by adding each of the plurality of correction vectors to the position of the signal transmission part 119, identified by the measuring instrument identifying part 242 in the device coordinate system based on the position of the wireless power transfer apparatus 2.

Figure 14:
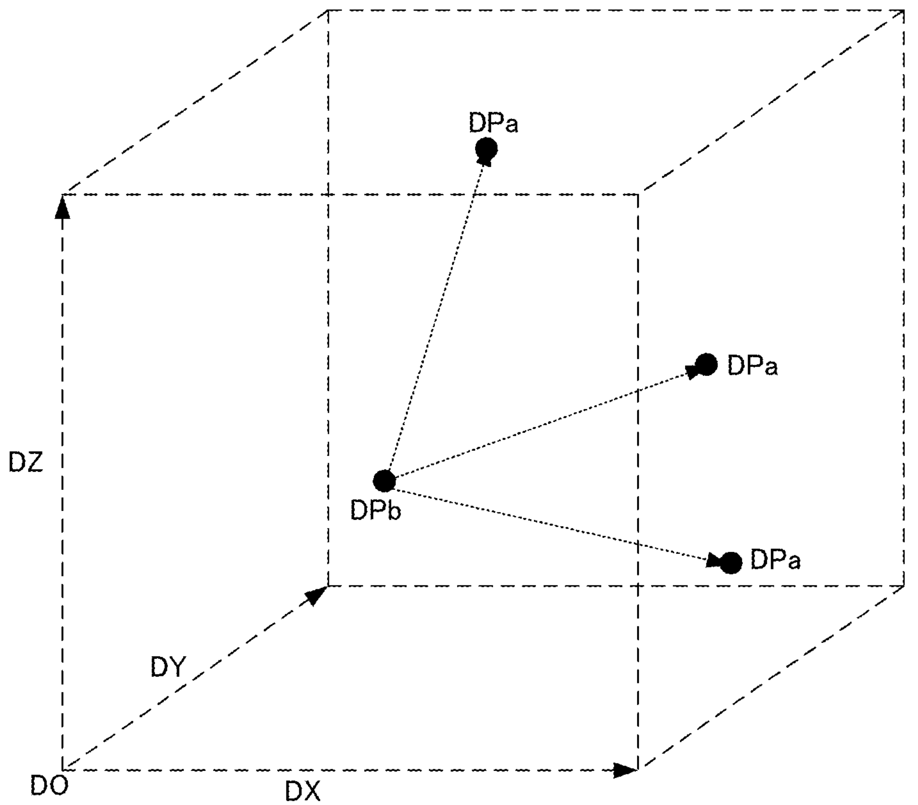
FIG. 14 shows an example of identifying respective positions of a plurality of power receiving antennas 110.

FIG. 14 shows an example of identifying the respective positions of the plurality of power receiving antennas 110. As shown in FIG. 14, the power receiving position identifying part 243 adds a plurality of correction vectors (indicated by dotted arrows) to a position DPb of the signal transmission part 119, identified by the measuring instrument identifying part 242 in the device coordinate system, to identify a position DPa of each of the plurality of power receiving antennas 110 in the device coordinate system.

In this way, the power receiving position identifying part 243 identifies i) the direction in which each of the plurality of power receiving antennas 110 is located after the posture change of the measuring instrument 1 and ii) the distance to each of the plurality of power receiving antennas 110 after the posture change of the measuring instrument 1, based on the wireless power transfer apparatus 2.

When the power receiving position identifying part 243 identifies the respective positions of the plurality of power receiving antennas 110 every time the signal receiving part 21 receives the beacon signal containing the information indicating the posture, the power receiving position identifying part 243 may also identify the respective positions of the plurality of power receiving antennas 110 even when the posture of the measuring instrument 1 has not changed, potentially increasing the processing load on the wireless power transfer apparatus 2. Accordingly, the power receiving position identifying part 243 may identify the respective positions of the plurality of power receiving antennas 110 on the basis of the posture of the measuring instrument 1 after the posture change, in response to the measuring instrument 1 detecting a change in its posture. For example, the power receiving position identifying part 243 identifies the respective positions of the plurality of power receiving antennas 110 upon identifying a change in the posture indicated by the posture information, and does not identify the respective positions of the plurality of power receiving antennas 110 while there is no change in the posture.

In this way, the power receiving position identifying part 243 re-identifies the respective positions of the plurality of power receiving antennas 110 when the posture of the measuring instrument 1 is changed, so that the processing load on the wireless power transfer apparatus 2 is reduced, making it less likely for processing delays to occur in the wireless power transfer apparatus 2.

The power transmission target identifying part 244 identifies, as a power transmission target, the power receiving antenna 110 that can receive the largest amount of power transmitted by the power transmission antenna 222 among the plurality of power receiving antennas 110, on the basis of the positions of the plurality of power receiving antennas 110 identified by the power receiving position identifying part 243. For example, the power transmission target identifying part 244 identifies, as the power transmission target, the power receiving antenna 110 that has the shortest distance to the power transmission antenna 222 among the plurality of power receiving antennas 110.

In this manner, the power transmission target identifying part 244 identifies the power receiving antenna 110 that has the shortest distance to the power transmission antenna 222 as the power transmission target, and thus it is possible to efficiently perform wireless power transfer. However, the power receiving antenna 110 having the shortest distance to the power transmission antenna 222 may be hidden behind the main body 12 of the measuring instrument 1 from the perspective of the power transmission antenna 222. In this case, even when the power transmission antenna 222 transmits power to the power receiving antenna 110 at the shortest distance, the main body 12 blocks the power, and therefore the power transmission efficiency cannot be considered optimal.

Accordingly, the power transmission target identifying part 244 identifies, as the power transmission target, a power receiving antenna 110 for which the main body 12 of the measuring instrument 1 is not located on a straight line connecting the power transmission antenna 222 and the power receiving antenna 110, by referring to shape data indicating the shape of the measuring instrument 1. For example, the power transmission target identifying part 244 determines, in order from the power receiving antenna 110 that is closest to the power transmission antenna 222, whether the main body 12 of the measuring instrument 1 is located on the straight line connecting the power transmission antenna 222 and the power receiving antenna 110, and identifies as the power transmission target the first power receiving antenna 110 for which it is determined that the main body 12 is not located on the straight line. In this manner, the power transmission target identifying part 244 identifies the power receiving antenna 110 that is not hidden behind the main body 12 of the measuring instrument 1 as the power transmission target, making it possible to efficiently perform wireless power transfer.

The power transmission controller 245 causes the power transmission antenna 222 to transmit power to the power receiving antenna 110 identified by the power transmission target identifying part 244. The power transmission controller 245 causes the power transmission part 22 to transmit power toward the power receiving antenna 110 to which power is to be transmitted, for example, by performing beamforming using the plurality of power transmission antennas 222 so that a radio wave is emitted in a direction in which the power receiving antenna 110 identified by the power transmission target identifying part 244 is located. The power transmission controller 245 may i) select the power transmission antenna 222 suitable for power transmission to the power receiving antenna 110 identified by the power transmission target identifying part 244, or ii) change the orientation of the power transmission antenna 222 so as to face the power receiving antenna 110 identified by the power transmission target identifying part 244.

It should be noted that in a case where there are a plurality of types of the measuring instrument 1 to which the wireless power transfer apparatus 2 can transfer power, the wireless power transfer apparatus 2 cannot identify the positions of the plurality of power receiving antennas 110 only by recognizing the posture of the measuring instrument 1. Accordingly, the memory 123 may store positional relationship data indicating the positions of the plurality of power receiving antennas 110 in the measuring instrument 1, and the signal transmission part 119 in the measuring instrument 1 may transmit a beacon signal including the positional relationship data to the wireless power transfer apparatus 2. The signal receiving part 21 in the wireless power transfer apparatus 2 receives the beacon signal including the positional relationship data. The power receiving position identifying part 243 identifies the respective positions of the plurality of power receiving antennas 110 on the basis of the positional relationship data included in the received beacon signal.

When the wireless power transfer apparatus 2 stores the positional relationship data in association with the type of the measuring instrument 1, the memory 123 may store the type data indicating the type of the measuring instrument 1, and the signal transmission part 119 in the measuring instrument 1 may transmit the beacon signal including the type data to the wireless power transfer apparatus 2. The signal receiving part 21 in the wireless power transfer apparatus 2 receives the beacon signal including the type data. The power receiving position identifying part 243 identifies the respective positions of the plurality of power receiving antennas 110 on the basis of the positional relationship data corresponding to the type data included in the received beacon signal.

Further, if the measuring instrument 1 that can be powered by the wireless power transfer apparatus 2 has a plurality of types of shapes, the power transmission target identifying part 244 cannot identify the power receiving antenna 110 that is not hidden behind the main body 12 of the measuring instrument 1 only by recognizing the posture of the measuring instrument 1. Accordingly, the memory 123 may store shape data indicating the shape of the measuring instrument 1, and the signal transmission part 119 in the measuring instrument 1 may transmit the beacon signal including the shape data to the wireless power transfer apparatus 2. The power transmission target identifying part 244 identifies the power receiving antenna 110 that is not hidden behind the main body 12 of the measuring instrument 1 by referring to the shape data included in the received beacon signal.

[Processing in Wireless Power Transfer Apparatus 2]

Figure 15:
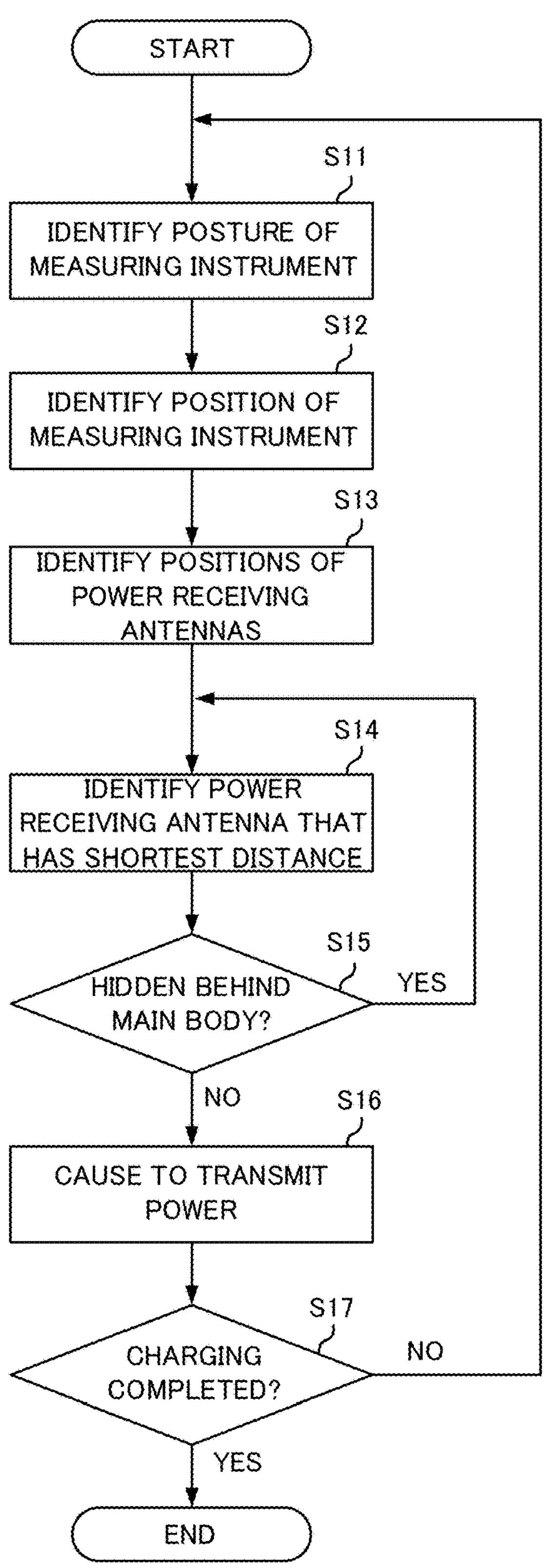
FIG. 15 is a flowchart illustrating processing executed by the wireless power transfer apparatus 2.

Processing executed by the wireless power transfer apparatus 2 will be described. FIG. 15 is a flowchart illustrating the processing executed by the wireless power transfer apparatus 2.

The signal receiving part 21 receives, from the measuring instrument 1, the beacon signal indicating the posture of the measuring instrument 1 detected by the gyro sensor included in the measuring instrument 1 that measures the angular velocity of the measuring instrument 1. The measuring instrument identifying part 242 identifies the posture of the measuring instrument 1 on the basis of the beacon signal received by the signal receiving part 21 (S11).

The measuring instrument identifying part 242 identifies the position of the measuring instrument 1 (the position of the signal transmission part 119) on the basis of the intensity and direction of the beacon signal received by the signal receiving part 21 (S12).

The power receiving position identifying part 243 identifies the respective positions of the plurality of power receiving antennas 110 on the basis of i) the positional relationship data indicating the positional relationship between the signal transmission part 119 and each of the plurality of power receiving antennas 110 in the measuring instrument 1, ii) the posture of the measuring instrument 1 identified by the measuring instrument identifying part 242, and iii) the position of the signal transmission part 119 identified by the measuring instrument identifying part 242 (S13).

The power transmission target identifying part 244 identifies, as the power transmission target, the power receiving antenna 110 that has the shortest distance to the power transmission antenna 222 among the plurality of power receiving antennas 110 (S14).

The power transmission target identifying part 244 determines whether or not the main body 12 of the measuring instrument 1 is located on the straight line connecting the power transmission antenna 222 and the identified power receiving antenna 110 (that is, whether or not the identified power receiving antenna 110 is hidden behind the main body 12 of the measuring instrument 1) (S15).

If the power transmission target identifying part 244 determines that the main body 12 of the measuring instrument 1 is located on the straight line connecting the power transmission antenna 222 and the identified power receiving antenna 110 (the identified power receiving antenna 110 is hidden behind the main body 12 of the measuring instrument 1) (S15: YES), the power transmission target identifying part 244 identifies, as the power transmission target, the power receiving antenna 110 that has the shortest distance to the power transmission antenna 222 among the power receiving antennas 110 other than the already identified power receiving antenna 110 (S14).

Then, the power transmission target identifying part 244 determines again whether or not the main body 12 of the measuring instrument 1 is located on the straight line connecting the power transmission antenna 222 and the identified power receiving antenna 110 (S15). In this way, the power transmission target identifying part 244 determines, in order from the power receiving antenna 110 that is closest to the power transmission antenna 222, whether or not the main body 12 of the measuring instrument 1 is located on the straight line connecting the power transmission antenna 222 and the power receiving antenna 110, and proceeds to the next step S16 when it is determined that the main body 12 is not located on the straight line.

If the power transmission target identifying part 244 determines that the main body 12 of the measuring instrument 1 is not located on the straight line connecting the power transmission antenna 222 and the identified power receiving antenna 110 (the identified power receiving antenna 110 is not hidden behind the main body 12 of the measuring instrument 1) (S15: NO), the power transmission controller 245 causes the power transmission antenna 222 to transmit power to the power receiving antenna 110 identified by the power transmission target identifying part 244 (S16).

The controller 24 of the wireless power transfer apparatus 2 determines whether or not the charging of the secondary battery 114 is completed on the basis of the beacon signal received by the signal receiving part 21 (S17). If the controller 24 determines that the charging of the secondary battery 114 is not completed (S17: NO), the process of step S11 is executed again. On the other hand, if the controller 24 determines that the charging of the secondary battery 114 is completed (S17: YES), the process ends.

The measuring instrument identifying part 242, the power receiving position identifying part 243, the power transmission target identifying part 244, and the power transmission controller 245 continuously execute the processing from S11 to S17 until the signal receiving part 21 receives the beacon signal indicating that the charging of the secondary battery 114 is completed from the measuring instrument 1.

[Effects of Wireless Power Transfer System S]

As described above, in the wireless power transfer system S, the power transmission target identifying part 244 can identify, as the power transmission target, the power receiving antenna 110 that can receive the largest amount of power transmitted by the power transmission antenna 222 among the plurality of power receiving antennas 110. As a result, even when the orientation of the measuring instrument 1 changes, the power transmission antenna 222 can transmit power to the power receiving antenna 110 that can easily receive the power transferred from the wireless power transfer apparatus 2 most. In addition, it is possible to efficiently perform wireless power transfer even when the operator performs work while holding the measuring instrument 1 in his/her hand.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

For example, although it has been exemplified that the measuring instrument 1 includes the power receiving module 11 housed in the housing portion ST, the measuring instrument 1 may be configured not to include the power receiving module 11, and the main body 12 may have the function of the power receiving module 11.

With respect to the embodiments including the above examples, the following appendixes are further disclosed.

APPENDIX 1

A portable measuring instrument that receives power transferred from a wireless power transfer apparatus for transferring power wirelessly, the measuring instrument includes a plurality of power receiving antennas that receive power transmitted from the wireless power transfer apparatus, a posture detection part that detects a posture of the measuring instrument, and a signal transmission part that transmits a beacon signal including information indicating a posture detected by the posture detection part, wherein after the signal transmission part transmits the beacon signal, any of the plurality of power receiving antennas receives power from the wireless power transfer apparatus.

APPENDIX 2

The measuring instrument according to Appendix 1, wherein the measuring instrument further includes a plurality of display devices corresponding to the plurality of power receiving antennas, respectively, and the display device, among the plurality of display devices, that corresponds to the power receiving antenna receiving power transmitted by a power transmission antenna transmitting power from the wireless power transfer apparatus displays that power is being received.

APPENDIX 3

The measuring instrument according to Appendix 1, wherein the signal transmission part transmits the beacon signal including positional relationship data indicating a positional relationship between the signal transmission part and each of the plurality of power receiving antennas in the measuring instrument.

APPENDIX 4

The measuring instrument according to Appendix 1, wherein the signal transmission part transmits the beacon signal including type data indicating a type of the measuring instrument.

APPENDIX 5

The measuring instrument according to Appendix 1, wherein the signal transmission part transmits the beacon signal including shape data indicating a shape of the measuring instrument.

APPENDIX 6

A wireless power transfer apparatus for transferring power wirelessly, includes a signal receiving part that receives a beacon signal including information indicating a posture of the measuring instrument from the measuring instrument having a plurality of power receiving antennas, a measuring instrument identifying part that identifies i) a position of a signal transmission part in the measuring instrument transmitting the beacon signal relative to the wireless power transfer apparatus and ii) a posture of the measuring instrument, on the basis of the beacon signal received by the signal receiving part, a power receiving position identifying part that identifies respective positions of the plurality of power receiving antennas on the basis of i) positional relationship data indicating a positional relationship between the signal transmission part and each of the plurality of power receiving antennas in the measuring instrument, ii) a position of the signal transmission part identified by the measuring instrument identifying part, and iii) a posture of the measuring instrument, a power transmission target identifying part that identifies, as a power transmission target, the power receiving antenna capable of receiving the largest amount of power transmitted by the power transmission antenna from among the plurality of power receiving antennas, on the basis of the identified respective positions of the plurality of power receiving antennas, and a power transmission controller that causes the power transmission antenna to transmit power to the identified power receiving antenna.

APPENDIX 7

The wireless power transfer apparatus according to Appendix 6, wherein the power transmission target identifying part identifies the power receiving antenna having the shortest distance to the power transmission antenna as the power transmission target from among the plurality of power receiving antennas.

APPENDIX 8

The wireless power transfer apparatus according to Appendix 6, wherein the signal receiving part receives the beacon signal including shape data indicating a shape of the measuring instrument, and the power transmission target identifying part identifies, as the power transmission target, the power receiving antenna for which the main body of the measuring instrument is not located on a straight line connecting the power transmitting antenna and the power receiving antenna, by referring to shape data indicating a shape of the measuring instrument.

APPENDIX 9

The wireless power transfer apparatus according to Appendix 6, wherein the power receiving position identifying part i) generates a plurality of correction vectors by correcting, on the basis of a posture of the measuring instrument, a plurality of vectors indicating positions of the plurality of power receiving antennas, indicated by the positional relationship data, with respect to the position of the signal transmission part in the measuring instrument coordinate system, and ii) identifies respective positions of the plurality of power receiving antennas by adding each of the plurality of correction vectors to the position of the signal transmission part identified by the measuring instrument identifying part in the device coordinate system referenced to the position of the wireless power transfer apparatus.

APPENDIX 10

The wireless power transfer apparatus according to Appendix 6, wherein the signal receiving part receives the beacon signal including the positional relationship data, and the power receiving position identifying part identifies respective positions of the plurality of power receiving antennas on the basis of the positional relationship data included in the beacon signal.

APPENDIX 11

The wireless power transfer apparatus according to Appendix 6, wherein the positional relationship data is stored in association with a type of the measuring instrument, the signal receiving part receives the beacon signal including type data indicating a type of the measuring instrument, and the power receiving position identifying part identifies respective positions of the plurality of power receiving antennas on the basis of the positional relationship data corresponding to type data included in the beacon signal.

APPENDIX 12

The wireless power transfer apparatus according to any one of Appendixes 6 to 11, wherein the power receiving position identifying part identifies respective positions of the plurality of power receiving antennas on the basis of the posture of the measuring instrument after the posture change in response to the measuring instrument detecting the change in the posture of the measuring instrument.

APPENDIX 13

A wireless power transfer system includes a wireless power transfer apparatus that transfers power wirelessly, and a measuring instrument that receives power transferred from the wireless power transfer apparatus, wherein the measuring instrument includes a plurality of power receiving antennas that receives power transmitted from the wireless power transfer apparatus, a posture detection part that detects a posture of the measuring instrument, and a signal transmission part that transmits a beacon signal including information indicating a posture detected by the posture detection part, wherein the wireless power transfer apparatus includes a power transmission antenna that transmits power from the wireless power transfer apparatus, a signal receiving part that receives the beacon signal, a measuring instrument identifying part that identifies a position of the signal transmission part relative to the wireless power transfer apparatus and a posture of the measuring instrument, on the basis of the beacon signal received by the signal receiving part, a power receiving position identifying part that identifies respective positions of the plurality of power receiving antennas on the basis of i) positional relationship data indicating a positional relationship between the signal transmission part and each of the plurality of power receiving antennas in the measuring instrument, ii) a position of the signal transmission part identified by the measuring instrument identifying part, and iii) a posture of the measuring instrument, a power transmission target identifying part that identifies, as a power transmission target, the power receiving antenna capable of receiving the largest amount of power transmitted by the power transmission antenna from among the plurality of power receiving antennas, on the basis of the identified respective positions of the plurality of power receiving antennas, and a power transmission controller that causes the power transmission antenna to transmit power to the identified power receiving antenna.

What is claimed is:

1. A portable measuring instrument that receives power transferred from a wireless power transfer apparatus for transferring power wirelessly, the measuring instrument comprising:

a plurality of power receiving antennas that receive power transmitted from the wireless power transfer apparatus;

a posture detection part that detects a posture of the measuring instrument; and a signal transmission part that transmits a beacon signal including information indicating the posture detected by the posture detection part, wherein after the signal transmission part transmits the beacon signal, any of the plurality of power receiving antennas receives power from the wireless power transfer apparatus.

2. The measuring instrument according to claim 1, wherein the measuring instrument further includes a plurality of display devices corresponding to the plurality of power receiving antennas, respectively, and the display device, among the plurality of display devices, that corresponds to the power receiving antenna receiving power transmitted by a power transmission antenna transmitting power from the wireless power transfer apparatus displays that power is being received.

3. The measuring instrument according to claim 1, wherein the signal transmission part transmits the beacon signal including positional relationship data indicating a positional relationship between the signal transmission part and each of the plurality of power receiving antennas in the measuring instrument.

4. The measuring instrument (1) according to claim 1, wherein the signal transmission part transmits the beacon signal including type data indicating a type of the measuring instrument.

5. The measuring instrument according to claim 1, wherein the signal transmission part transmits the beacon signal including shape data indicating a shape of the measuring instrument.

6. A wireless power transfer apparatus for transferring power wirelessly, comprising:

a signal receiving part that receives a beacon signal including information indicating a posture of the measuring instrument from the measuring instrument having a plurality of power receiving antennas;

a measuring instrument identifying part that identifies i) a position of a signal transmission part in the measuring instrument transmitting the beacon signal relative to the wireless power transfer apparatus and ii) a posture of the measuring instrument, on the basis of the beacon signal received by the signal receiving part;

a power receiving position identifying part that identifies respective positions of the plurality of power receiving antennas on the basis of i) positional relationship data indicating a positional relationship between the signal transmission part and each of the plurality of power receiving antennas in the measuring instrument, ii) a position of the signal transmission part identified by the measuring instrument identifying part, and iii) a posture of the measuring instrument;

a power transmission target identifying part that identifies, as a power transmission target, the power receiving antenna capable of receiving the largest amount of power transmitted by the power transmission antenna from among the plurality of power receiving antennas, on the basis of the identified respective positions of the plurality of power receiving antennas; and a power transmission controller that causes the power transmission antenna to transmit power to the identified power receiving antenna.

7. The wireless power transfer apparatus according to claim 6, wherein the power transmission target identifying part identifies the power receiving antenna having the shortest distance to the power transmission antenna as the power transmission target from among the plurality of power receiving antennas.

8. The wireless power transfer apparatus according to claim 6, wherein the signal receiving part receives the beacon signal including shape data indicating a shape of the measuring instrument, and the power transmission target identifying part identifies, as the power transmission target, the power receiving antenna for which the main body of the measuring instrument is not located on a straight line connecting the power transmitting antenna and the power receiving antenna, by referring to shape data indicating a shape of the measuring instrument.

9. The wireless power transfer apparatus according to claim 6, wherein the power receiving position identifying part i) generates a plurality of correction vectors by correcting, on the basis of the posture of the measuring instrument, a plurality of vectors indicating positions of the plurality of power receiving antennas, indicated by the positional relationship data, with respect to the position of the signal transmission part in the measuring instrument coordinate system, and ii) identifies respective positions of the plurality of power receiving antennas by adding each of the plurality of correction vectors to the position of the signal transmission part identified by the measuring instrument identifying part in the device coordinate system referenced to the position of the wireless power transfer apparatus.

10. The wireless power transfer apparatus according to claim 6, wherein the signal receiving part receives the beacon signal including the positional relationship data, and the power receiving position identifying part identifies respective positions of the plurality of power receiving antennas on the basis of the positional relationship data included in the beacon signal.

11. The wireless power transfer apparatus according to claim 6, wherein the positional relationship data is stored in association with a type of the measuring instrument, the signal receiving part receives the beacon signal including type data indicating a type of the measuring instrument, and the power receiving position identifying part identifies respective positions of the plurality of power receiving antennas on the basis of the positional relationship data corresponding to type data included in the beacon signal.

12. The wireless power transfer apparatus according to claim 6, wherein the power receiving position identifying part identifies respective positions of the plurality of power receiving antennas on the basis of the posture of the measuring instrument after the posture change in response to the measuring instrument detecting the change in the posture of the measuring instrument.

13. A wireless power transfer system comprising:

a wireless power transfer apparatus that transfers power wirelessly; and a measuring instrument that receives power transferred from the wireless power transfer apparatus, wherein the measuring instrument includes:

a plurality of power receiving antennas that receives power transmitted from the wireless power transfer apparatus, a posture detection part that detects a posture of the measuring instrument, and a signal transmission part that transmits a beacon signal including information indicating a posture detected by the posture detection part, wherein the wireless power transfer apparatus includes:

a power transmission antenna that transmits power from the wireless power transfer apparatus, a signal receiving part that receives the beacon signal, a measuring instrument identifying part that identifies a position of the signal transmission part relative to the wireless power transfer apparatus and a posture of the measuring instrument, on the basis of the beacon signal received by the signal receiving part, a power receiving position identifying part that identifies respective positions of the plurality of power receiving antennas on the basis of i) positional relationship data indicating a positional relationship between the signal transmission part and each of the plurality of power receiving antennas in the measuring instrument, ii) a position of the signal transmission part identified by the measuring instrument identifying part, and iii) a posture of the measuring instrument, a power transmission target identifying part that identifies, as a power transmission target, the power receiving antenna capable of receiving the largest amount of power transmitted by the power transmission antenna from among the plurality of power receiving antennas, on the basis of the identified respective positions of the plurality of power receiving antennas, and a power transmission controller that causes the power transmission antenna to transmit power to the identified power receiving antenna.

* * * * *